(12) United States Patent
Saldamli

(10) Patent No.: US 9,436,835 B1
(45) Date of Patent: Sep. 6, 2016

(54) HOMOMORPHIC ENCRYPTION IN COMPUTING SYSTEMS AND ENVIRONMENTS

(71) Applicant: Gokay Saldamli, San Jose, CA (US)

(72) Inventor: Gokay Saldamli, San Jose, CA (US)

(73) Assignee: Gokay Saldamli, Menlo Park, CA (US)

( * ) Notice: Subject to any disclaimer, the term of this patent is extended or adjusted under 35 U.S.C. 154(b) by 0 days.

(21) Appl. No.: 13/734,965

(22) Filed: Jan. 5, 2013

Related U.S. Application Data

(60) Provisional application No. 61/583,594, filed on Jan. 5, 2012.

(51) Int. Cl.
*H04L 9/28* (2006.01)
*G06F 21/60* (2013.01)
*H04N 19/60* (2014.01)

(52) U.S. Cl.
CPC .................................. *G06F 21/602* (2013.01)

(58) Field of Classification Search
CPC ............... H04L 9/3093; H04L 9/0662; H04L 2209/16; H04L 2209/56; G06F 7/723; G06F 7/725; G06F 7/582; G06F 7/724
See application file for complete search history.

(56) References Cited

U.S. PATENT DOCUMENTS

| 6,505,299 B1 * | 1/2003 | Zeng et al. ................... 713/160 |
| 7,493,489 B2 * | 2/2009 | de Queiroz .................... 713/176 |
| 8,340,285 B2 * | 12/2012 | Tian ................................ 380/37 |
| 8,374,340 B2 * | 2/2013 | Puech et al. .................... 380/28 |

OTHER PUBLICATIONS

Image Encryption using the Reciprocal-Orthongal Parametric Transform. Bouguezel et al. IEEE(2010).*
Spectral Modular Arithmetic for Cryptgraphy. Saldamli et al. Springer(2009).*

* cited by examiner

*Primary Examiner* — Venkat Perungavoor

(57) ABSTRACT

A transformation function that satisfies at least linearity and convolution can be used to encrypt data. The transformation function can, for example, be a DFT with one or more evaluation points that can be kept secret for encryption. The transformation function can effectively serve as a transform map and can be used to achieve fully homographic encryption in a system where encrypted data can be manipulated by applying one or more operations and the resulting encrypted data can be decrypted by applying the inverse of the transformation function and/or transformation map. A transformation function that satisfies at least linearity and convolution can be used for various applications, including, for example, private/public key decryption schemes, a signature schemes, database query and search schemes, as well as various applications of homomorphic operations.

18 Claims, 11 Drawing Sheets

HOMOMORPHIC ENCRYPTION IN COMPUTING SYSTEMS AND ENVIRONMENTS

CROSS-REFERENCES TO THE RELATED APPLICATIONS

This application takes priority from the Unites States (U.S.) Provisional Patent Application No. 61/583,594, entitled: "HOMOMORPHIC CRYPTOSYSTEM METHOD AND APPARATUS," filed on Jan. 5, 2012, by Gokay Saldamli, which is hereby incorporated by reference herein in its entirety and for all purposes.

BACKGROUND

Homomorphic encryption is a form of encryption where a specific algebraic operation (e.g., addition or multiplication) performed on the plaintext can be equivalent to another (possibly different) algebraic operation performed on the ciphertext. An encryption scheme which supports both addition and multiplication (thereby preserving the ring structure of plaintexts) is generally known as fully homomorphic encryption (FHE).

Theoretically, FHE can allow any function, including those computed by miscellaneous complex operations (consisting of additions, multiplications, etc.) homomorphically, e.g., encrypted queries to a search engine, or searching on encrypted data (in a database). Such a scheme would allow computation of arbitrary functions over encrypted data without having to perform any decryption during this computation.

As those skilled in the art readily appreciate, techniques for encryption, especially homomorphic encryption are highly useful.

SUMMARY

Broadly speaking, the invention relates to computing environments and systems. More particularly, the invention relates to techniques for encryption and decryption of data in computing environments and systems, including database environments and systems.

In accordance with one aspect of the invention, a transformation function that satisfies at least linearity and convolution can be used to encrypt data. The transformation function can, for example, be a Discrete Fourier Transform (DFT), or a discrete Hartley transform (DHT), or a discrete cosine transform (DCT) with one or more evaluation points that can be kept secret for encryption.

The transformation function can effectively serve as a transform map and can be used to achieve fully homographic encryption in a system where encrypted data can be manipulated by applying one or more operations in accordance with another aspect of the invention. The resulting encrypted data can be decrypted by applying the inverse of the transformation function and/or transformation map in accordance with another aspect of the invention.

Yet other aspects of the invention include, using a transformation function that satisfies at least linearity and convolution in private/public key decryption schemes, signature schemes, database query and search schemes, as well as various applications of homomorphic operations.

Still aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

Figure 1A:
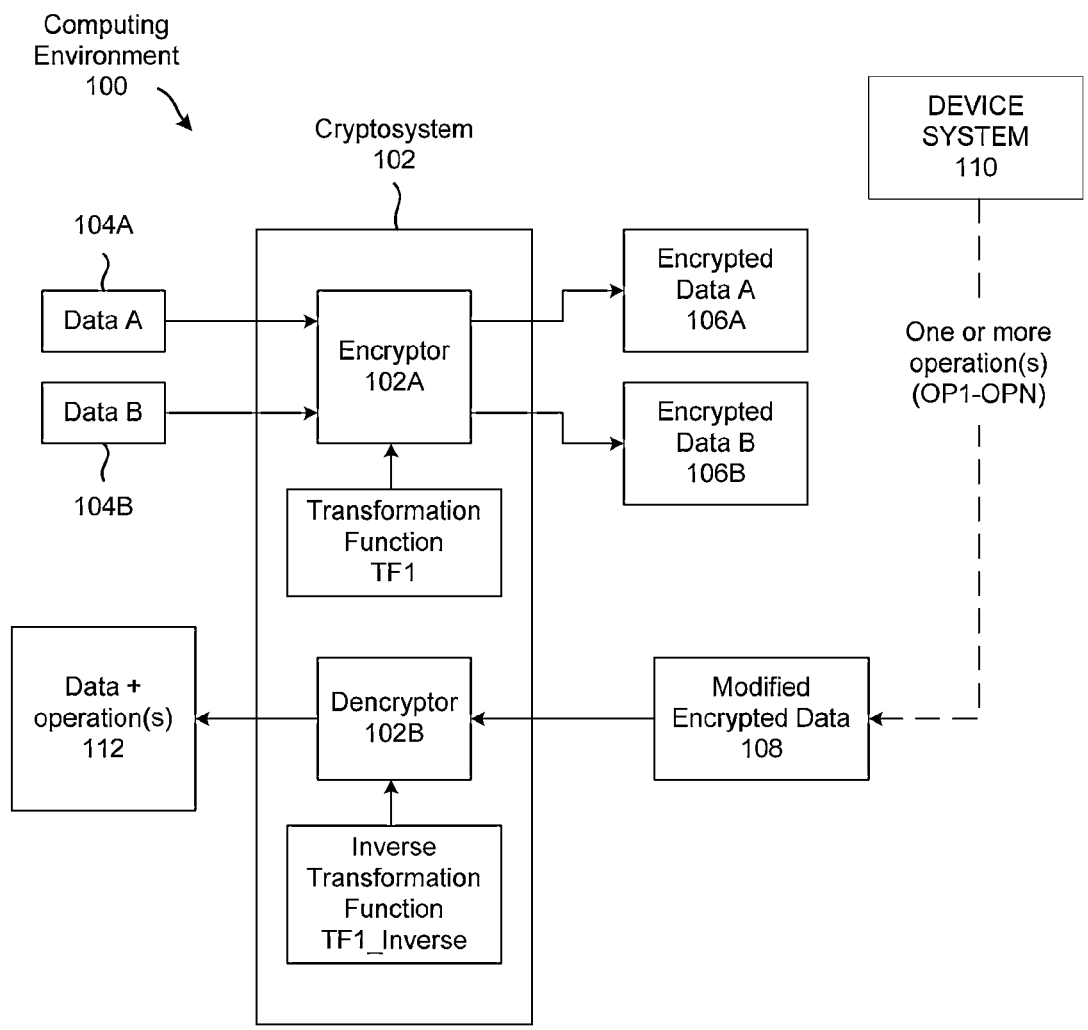
FIG. 1A depicts a computing environment with a cryptosystem in accordance with one embodiment of the invention.

Other aspects and advantages of the invention will become apparent from the following detailed description, taken in conjunction with the accompanying drawings, illustrating by way of example the principles of the invention.

DETAILED DESCRIPTION

As noted in the background section, techniques for encryption, especially homomorphic encryption are highly useful. However, as those skilled in the art readily appreciate, achieving homorophic encryption can be very difficult and fraught with problems, such as, for example, requiring support very complex operations that may cause overflow problems. The problem finding a fully homorophic encryption (FHE) is not a very recent engagement. In 1978, Rivest et al. (R. Rivest, L. Adleman, M. Dertouzos, On data banks and privacy homomorphisms, Foundations of Secure Computation, pp. 169-177, 1978) addressed a homomorphic encryption scheme. Unfortunately, however, the "privacy homomorphism" of Rivest et al., was effectively "broken" a couple of years later by Brickell and Yacobi (E. Brickell and Y. Yacobi, On privacy homomorphisms, Advances in Cryptography—Euorocrypt'87. LNCS 304, Springer-Verlag, pp. 117-125, 1987). The question of whether it is possible to construct a fully homomorphic encryption scheme, i.e. a scheme which supports the computation of arbitrary functions on encrypted data (with no limit on the number of multiplications), in the cryptographic community was long believed to be a holy grail. In 2009, Gentry, theoretically, solved this problem by presenting his fully homomorphic encryption scheme (FHE) based on ideal lattices in (Craig Gentry. Fully Homomorphic Encryption Using Ideal Lattices, in the 41st ACM Symposium on Theory of Computing (STOC), 2009).

As those skilled in the art will appreciate the FHE solution of Gentry can be very computationally expensive. In any case, there is a need for alternative techniques for homomorphic encryption.

Accordingly, techniques for homomorphic encryption are disclosed. In disclosing these techniques, to facilitate better understanding for those who may not be skilled in the art, initially, a brief introduction to the polynomials and their arithmetic is provided even though those skilled in the art generally understand polynomials and their arithmetic.

Abstractly, a ring R can be a set of objects together with two binary operations—addition and multiplication—defined on pairs of ring elements satisfying an Abelian group with respect to addition, multiplicative associativity, and distributivity. R can be said to be commutative if this applies to multiplication, and the existence of a multiplicative identity element makes the ring a ring with identity. A ring as used hereinafter can be a commutative ring with identity. Moreover, if R is a commutative multiplicative group, afield can be defined a ring in which R is an abelian group with respect to both binary operations.

In this context, a set of polynomials R[t] over a ring R can form a ring with polynomial addition and multiplication. If f(t) is a polynomial in R[t], the ring R[t]/($\phi$(t)) can be called a factor ring where ($\phi$(t))={r(t) $\phi$(t)||r(t) $\in$ R[t]}. Note that factor ring is the set of polynomials having degree less than d over R: R[t]/($\phi$(t))={$a_0+a_1t+ \ldots +a_{d-1}t^{d-1}|a_i \in$ R}, equipped with polynomial addition and multiplication modulo f(t) where coefficients are computed mod n.

Another way of representing the elements of R[t] is to use a vector notation $(a):=[a_0, a_1, \ldots a_{d-1}]$. These two notations can be used interchangeably. Assuming $R=Z_n$ some operations including addition, multiplication, component-wise multiplication and some transforms over $Z_n[t]/(\phi(t))$ are discussed even though that are generally well known in the art.

Addition: operation in polynomial the ring $Z_n[t]/(\phi(t))$ can be performed modulo n. In other words: the coefficients of the operands can be simply added modulo n. The resulting polynomial can be defined as the sum of the two input polynomials as example 1 shows below.

Example 1

Let $x(t)=2t^3+3t+5$ and $y(t)=4t^2+2$ be elements of $Z_6[t]$. Then, $x(t)+y(t)=(2t^3+3t+5)+(4t^2+2) \equiv 2t^3+4t^2+3t+1$ mod 6. In vector notation, this can be represented as: (x)+(y)=[2,0,3,5]+[0,4,0,2]=[2,4,3,1] mod 6.

Although addition can be trivial, multiplication which corresponds to cyclic convolution can be prohibitively complicated. In a standard setting, multiplication in $Z_n[t]/(\phi(t))$ can consist of two phases: polynomial multiplication (i.e. linear convolution) and reduction by $\phi(t)$ polynomial.

Multiplication: multiplication operation in $Z_n[t]/(\phi(t))$ can involve performing polynomial multiplication modulo n and $\phi(t)$ as Example 2 shows below.

Example 2

Let $\phi(t)=t^5-1$ be the defining monic polynomial for $Z_n[t]/(\phi(t))$; for $x(t)=2 t^3+3t+1$ and $y(t)=4t^2+1$, multiplication is performed as follows:

$x(t)y(t)=(2t^3+3t+1)(4t^2+1)=8t^5+14t^3+3t+4t^2+1 \equiv 2t^3+ 4t^2+3t+3$ mod $\phi(t)$.

In vector notation, multiplication of two polynomial corresponds to the cyclic convolution (x)*(y)=[2,0,3,5]*[0,4,0,2]=[2,4,3,3] mod 6.

Component-wise product: Another operation to note is the component-wise multiplication which can simply be multiplication of two vectors pair-wisely noted as ⓧ used herein and in Example 3 below.

Example 3

Let (x)=[2,0,3,5] and (y)=[0,4,0,2] be the vectors as before then [2,0,3,5] ⓧ [0,4,0,2]=[0,0,0,4] mod 6. Similarly, in polynomial notation, component-wise product can be defined by x(t) ⓧ y(t)=(2t^3+3t+5) ⓧ (4t^2+2)=4.

Evaluation and interpolation: Evaluation and interpolation are also generally well known in the art. Classical coefficient representation can be used to evaluate the polynomial x(t) at a given point $e_0$, by plugging in $e_0$ and computing each term. (see, for example, The Horner's rule, T. H. Cormen, R. L. Rivest, C. E. Leiserson, and C. Stein, *Introduction to Algorithms*, 3rd ed. MIT Press, 2009).

Generally, Point-value representation of a polynomial can be defined and used in multiplication/convolution, as well as interpolation.

Definition 1. A point-value representation of a polynomial x(t) of degree d can be a set of n point-value pairs $(e_0, X_0)$, $(e_1, X_1), \ldots, (e_{d-1}, X_{d-1})$ such that all of the $e_i$ are distinct and $X_i=x(e_i)$ for i=0, 1, . . . , d-1.

It should be note that a polynomial can many different point-value representations, since any set of d distinct points $e_0, e_1, \ldots, e_{d-1}$ can be used as a basis for the representation. Given a polynomial represented in coefficient form, it can be relatively straightforward to compute its point-value representation be selecting any d distinct points $e_0, e_1, \ldots, e_{d-1}$ and then evaluating $x(e_i)$ for i=0, 1, . . . , d-1. The following matrix multiplication (Eqn. 1) can exhibit this computation.

$$\begin{bmatrix} X_0 \\ X \\ X_2 \\ \vdots \\ X_{d-1} \end{bmatrix} = \begin{bmatrix} 1 & e_0 & e_0^2 & \cdots & e_0^{d-1} \\ 1 & e_1 & e_1^2 & \cdots & e_1^{d-1} \\ 1 & e_2 & e_2^2 & \cdots & e_2^{d-1} \\ \vdots & \vdots & \vdots & \ddots & \vdots \\ 1 & e_{d-1} & e_{d-1}^2 & \cdots & e_{d-1}^{d-1} \end{bmatrix} \begin{bmatrix} x_0 \\ x_1 \\ x_2 \\ \vdots \\ x_{d-1} \end{bmatrix} \mod n \quad \text{Eqn. (1)}$$

The inverse of the evaluation (i.e. determining the coefficient form from a point-value representation) can be called interpolation. Firstly, interpolation of a polynomial can be well-defined and unique if the d×d matrix in Eqn. (1) (i.e., Vandermonde matrix) is invertible. In fact, this can be referred to as a matrix having the following determinant: det(V)=

$$\prod_{0 \le i < j \le d-1} (e_j - e_i).$$

Since the evaluation points can be distinct, det(V) can be non-zero. Thus, a transform matrix can be invertible and the interpolation can be unique.

Another way of seeing the uniqueness of the interpolation is to use the Lagrange form. Consider the polynomial $$\phi(t) = \prod_{i=0}^{d-1} (t - e_i)$$

where $e_i \in R$ for $0 \le i \le d-1$ and $e_i \ne e_j$ for $i \ne j$. Firstly, it should be noted that for an arbitrary polynomial $x(t) \in R[t]$, $x(t) \mod(t-e_i) = x(e_i)$ can be obtained. Now, consider the following ring homomorphism given by the Chinese Remaindering Theorem (CRT)

$$R[t]/(\phi(t)) \to R[t]/(t-e_0) \times \ldots \times R[t]/(t-e_{d-1}) \times \to [x \mod (t-e_0), \ldots, x \mod(t-e_{d-1})] \quad \text{(Eqn. 2)}$$

In fact, the homomorphism in (Eqn2.) can be represented as the evaluation map of the polynomial x at all points $e_0$, $e_1, \ldots, e_{d-1}$: $x \to [x(e_0), x(e_1), \ldots, x(e_{d-1})]$. Moreover, if deg $(x(t)) \le d-1$ then the polynomial $$x(t) = \sum_{i=0}^{d-1} x_i l_i(t)$$

can be the (unique) Lagrange interpolation polynomial satisfying $x_i = x(e_i)$ where $l_i$'s are the Lagrange interpolants such that, for all $0 \le i \le d-1$, $l_i(t) =$ $$\prod_{\{j=0, i \ne j\}}^{d-1} \frac{t - e_j}{e_i - e_j}.$$

Here, CRT can be equivalent to the Lagrange interpolation. To be more specific, the CRT and Lagrange interpolation can be used to determine that the interpolation polynomial is unique modulo $$\phi(t) = \prod_{i=0}^{d-1} (t - e_i)$$

so that there is exactly one polynomial $x(t) \in R[t]$ having degree less than the degree of the defining polynomial $\phi(t)$, satisfying $x_i = x(e_i)$ for all $i = 0, 1, \ldots, d-1$.

Transform: the choice of the evaluation points (i.e. the roots of the $\phi(t)$ polynomial) can clearly define the evaluation map. Assume that T is a transform described in (Eqn. 2) and defined for some $$\phi(t) = \prod_{i=0}^{d-1} (t - e_i)$$

where $e_i \ne e_j$ for $i \ne j$, Then: $x(t) \leftrightarrow X(t)$ where $x(t)$ and $X(t)$ are transform pairs. It should be noted that $x(t)$ can be called a time polynomial with time coefficients and $X(t)$ can be called as the spectrum of $x(t)$. Note that $X(t)$ can be the polynomial representation of the vector $[x(e_0), x(e_1), \ldots, x(e_{d-1})]$ (see Eqn. 2 above)

Let $(x(t), X(t))$ and $(y(t), Y(t))$ be two transform pairs, then it can be assumed that T satisfies the following two properties:

(i) Linearity: this property shows that T respects additions and subtractions. Literally, addition and subtraction in the time domain correspond to addition and subtraction in the frequency domain, $x(t) \pm y(t) \leftrightarrow X(t) \pm Y(t)$ (ii) Convolution: this property states that convolutions in time domain correspond to component-wise multiplication in the spectrum or vice versa. Some transforms may not have this property in both directions. However, satisfying at least one direction is sufficient to satisfy this property for the transform. In other words, it can be said that $x(t)*y(t) \leftrightarrow X(t) \otimes Y(t)$ or $x(t) \otimes y(t) \leftrightarrow X(t)*Y(t)$. However, this is the case of a linear convolution where degree of the product $x(t)*y(t)$ is less than d. If $\deg(x(t)*y(t)) \ge d$ then cyclic convolution can be considered. In other words a cyclic convolution can be satisfied modulo the polynomial $\phi(t)$.

It will be appreciated that the various transforms and their inverses, including Discrete Fourier Transform (DFT), discrete Hartley transform (DHT), discrete cosine transform (DCT) can satisfy these properties. Recalling that the Lagrange transform is the inverse of the evaluation map, as the Example 4 below shows, a Lagrange transform (a.k.a. interpolation) can satisfy these properties.

Example 4

Let $n = pq = 7 \cdot 13 = 91$ and let T be a 3-point transform having evaluation points $(e_0, e_1, e_2) := (3, 5, 11)$ and $$\phi(t) = \prod_{i=0}^{3-1} (t - e_i) = 17 + 12t + 72t^2 + t^3.$$

Let $X(t) = 1 + 2t + 3t^2$ and $Y(t) = 2 + 3t + 2t^2$ be two polynomials in the spectrum, note that $Z(t) := (X(t) + Y(t)) \otimes Y(t)$ can easily be computed as: $Z(t) = 6 + 15t + 10t^2$.

The same computation can be carried in time using the linearity and convolution properties. Observe that Lagrange interpolations of $X(t)$ and $Y(t)$ can give the transform pairs in time $x(t) = 33 + 16 t + 72 t^2$ and $y(t) = 22 + 77 t + 53 t^2$. Now computing: $z(t) := (x(t) + y(t))*y(t)$ gives: $z(t) \equiv 28 + 25 t + 60 t^2$ mod $\phi(t)$, but evaluating the $z(t)$ at the evaluation point $(e_0, e_1, e_2)$ gives: $z(e_0) \equiv 6$ mod 91, $z(e_1) \equiv 15$ mod 91 and $z(e_2) \equiv 10$ mod 91. Hence, $Z(t) = 6 + 15t + 10t^2$.

Note that in the art, fast transforms can be used for fast convolution computations. However, in the disclosed techniques, the secure pair-wise multiplication computation can be primarily considered. Therefore, convolution calculations can be considered for public-key encryption, signature generation, homomorphic encryption, etc. In fact, Example 4 suggests that an inverse map (i.e. Lagrange interpolation) can be deployed for such purposes. Later, in Example 8, a secure NAND gate can be realized using Lagrange transform.

Given that DFT can be a popular map that enjoys these properties, a short introduction to DFT computation in integer rings is provided below and DFT will be disclosed in greater detail as one embodiment of the invention.

Computation of DFT in $Z_n$: In vector notation, the DFT of a sequence $(x)=[x_0, x_1, \ldots, x_{d-1}]$ can be defined as the sequence $(X)=[X_0, X_1, \ldots, X_{d-1}]$ such that:

$$X_j = \sum_{i=0}^{d-1} x_i w^{ij} \bmod n, \quad \text{(Eqn. 3)}$$

where w is the d-th root of unity. The DFT function can normally be used over the field of complex numbers C. However, in the disclosed techniques method, DFT over a finite ring or field structure is ysed (see, for example, J. M. Pollard, The fast Fourier transform in a finite field, Mathematics of Computation, vol. 25, pp. 365-374, 1971 and R. E. Blahut, Fast Algorithms for digital signal processing, Addison-Wesley publishing Company, 1985).

In fact, the sum given in Eqn. (3) above can also be put into a matrix-vector product modulo n where the resulting system would be same as the d roots of unities $w^0, w^1, w^{d-1}$ are plugged into Eqn. (1) as the evaluation points. Hence, the resulting system would be a matrix-vector product by X=Tx, where T (a special form of Vandermonde matrix) is a d×d transformation matrix. The inverse DFT can be defined as $x=T^{-1}X$. It turns out that the inverse of T can easily be obtained by replacing every entry in the transform matrix with its reciprocal, and then multiplying the resulting matrix with $d^{-1}$. The inverse matrix is given modulo n as:

$$T^{-1} = d^{-1} \cdot \begin{bmatrix} 1 & 1 & 1 & \ldots & 1 \\ 1 & w^{-1} & w^{-2} & \ldots & w^{-(d-1)} \\ 1 & w^{-2} & w^{-4} & \ldots & w^{-2(d-1)} \\ \vdots & \vdots & \vdots & \ddots & \vdots \\ 1 & w^{-(d-1)} & w^{-2(d-1)} & \ldots & w^{-(d-1)(d-1)} \end{bmatrix} \bmod n$$

The matrix-vector product definition of the DFT implies an algorithm to compute the DFT function. However, it can require d multiplications and d−1 additions to compute an entry of the output sequence (X). However, the Fast Fourier Transform (FFT) algorithm which reduces the complexity can be used.

To facilitate better understanding, consider an example showing the DFT computation over $Z_n$. A more comprehensive reference is G. Saldamli, *Spectral Modular Arithmetic*, Ph.D. thesis, Department of Electrical and Computer Engineering, Oregon State University, May 2005.

Multi-dimensional of DFT: multi-dimensional transforms can be defined in virtually any field of interest on multi-dimensional array of data or in polynomial notation multivariate polynomials. The multidimensional DFT of a multidimensional array $x_{n_1, n_2, \ldots, n_s}$ that is a function of d discrete variables $n_l=0, 1, \ldots, d_l-1$ for $l=1, 2, \ldots, s$ is defined by:

$$X_{k_1, k_2, \ldots, k_3} = \sum_{n_1=0}^{d_1-1} \left( w_{d_1}^{k_1 n_1} \sum_{n_2=0}^{d_2-1} \left( w_{d_2}^{k_2 n_2} \ldots \sum_{n_s=0}^{d_s-1} w_{d_s}^{k_s n_s} \cdot x_{n_1, n_2, \ldots, n_s} \right) \right) \bmod n \quad (4)$$

where $w_{d_l}$ is a $d_l$ root of unity in $Z_n$ as above and the s output indices run from $k_l=0, 1, \ldots, d_l-1$. An algorithm to compute a one-dimensional DFT can thus be sufficient to efficiently compute a multidimensional DFT (see, for example, Chapter 7 of R. E. Blahut, Fast Algorithms for digital signal processing, Addison-Wesley publishing Company, 1985).

Here, a connection between the polynomials and multi-dimensional transforms is made to facilitate an even easier understanding of the disclosed homorophic encryption. Multi-dimensional data arrays can be seen as multivariate polynomial. For instance a 3×3 array A=[[2,1,3], [1,1,3], [2,3,5]] can be written in polynomial form in two variables (x, y) as: $A(x, y)=(2+x+3x^2)+(1+x+3x^2)y+(2+3x+5x^2) y^2$. Moreover, it should be noted that a two dimensional cyclic convolution can be written in terms of polynomials as: $Z(x, y)=A(x, y)*B(x, y) \bmod (x^{d1}-1) \bmod(y^{d2}-1)$.

Example 5

Let $n=pq=1453 \cdot 1973=2866769$, $d=4$, and $w=629646$. The elements of the transformation matrix T are of the form $w^{ij} \bmod n$ for i, j=0, 1, 2, 3. We compute these values and plug them into the transformation matrix as follows:

$$T = \begin{pmatrix} 1 & 1 & 1 & 1 \\ 1 & 629646 & 2866768 & 2237123 \\ 1 & 2866768 & 1 & 2866768 \\ 1 & 2237123 & 2866768 & 629646 \end{pmatrix}$$

The inverse transformation matrix $T^{-1}$ can be obtained similarly using the multiplicative inverses: $d^{-1}=4^{-1} \bmod 2866769=2150077$, $w^{-1}=629646^{-1} \bmod 2866769=2237123$. This can be obtained and represented as:

$$T^{-1} = \begin{pmatrix} 1 & 1 & 1 & 1 \\ 1 & 2237123 & 2866768 & 629646 \\ 1 & 2866768 & 1 & 2866768 \\ 1 & 629646 & 2866768 & 2237123 \end{pmatrix}$$

Now compute $X(t)=DFT(x(t))$ with the input polynomial $x(t)=1+2t+3t^3+4t^4$. Note that in vector notation $(x)=[1,2,3,4]$ and its transform can be computed by matrix-vector product. This vector X(t) can be obtained and represented as:

$$\begin{pmatrix} 10 \\ 1607475 \\ 2866767 \\ 1259290 \end{pmatrix} = \begin{pmatrix} 1 & 1 & 1 & 1 \\ 1 & 629646 & 2866768 & 2237123 \\ 1 & 2866768 & 1 & 2866768 \\ 1 & 2237123 & 2866768 & 629646 \end{pmatrix} \begin{pmatrix} 1 \\ 2 \\ 3 \\ 4 \end{pmatrix}$$

Recall that virtually all multiplications and additions can be performed modulo n=2866769. Relating x(t) and X(t) via DFT map, and call these as transform pairs where $X(t)=10+1607475 t+2866767 t^2+1259290 t^3$ in polynomial notation. Now, lets compute $z(t)=(x(t)+y(t))*y(t) \bmod \phi(t)$ (i.e., the polynomial in Example 4 where convolution is replaced with component-wise multiplication) for $y(t)=2+3t+2t^2$ and $$\phi(t) = \prod_{i=0}^{3} (t-w^i) = t^4 - 1$$

using DFT and its linearity and convolution properties. Note that in time domain: $z(t):=(x(t)+y(t))*y(t) \bmod \phi(t)=28+27t+31t^2+33t^3$.

In fact, convolution calculation using DFT (or more favorably FFT) can be an important tool used today in the analysis and manipulation of digital or discrete data. This computation can require transform of operands to spectrum; a term-by-term multiplication and an inverse DFT transform calculation. Using the above matrix Y(t) can be computed as:

$$Y(t)=7+1888938t+t^2+977831t^3$$

$$Z(t):=(X(t)+Y(t))*Y(t) \bmod \phi(t)=119+1955659t+2866768t^2+911104t^3 \text{ Taking the inverse transform gives the same result as we compute before:}$$

$$z(t)=28+27t+31t^2+33t^3.$$

As noted above, alternative techniques for homomorphic encryption are needed and would be very useful. As such, it will be appreciated that a transformation function that satisfies at least linearity and convolution can be used to encrypt data in accordance with one aspect of the invention. The transformation function can, for example, be a Discrete Fourier Transform (DFT), or a discrete Hartley transform (DHT), or a discrete cosine transform (DCT) with one or more evaluation points that can be kept secret for encryption.

The transformation function can effectively serve as a transform map and can be used to achieve fully homographic encryption in a system where encrypted data can be manipulated by applying one or more operations in accordance with another aspect of the invention. The resulting encrypted data can be decrypted by applying the inverse of the transformation function and/or transformation map in accordance with another aspect of the invention. Yet other aspects of the invention include, using a transformation function that satisfies at least linearity and convolution private/public key decryption schemes, a signature schemes, database query and search schemes, as well as various application of homomorphic operations.

Embodiments of these aspects of the invention are also discussed below with reference to FIGS. 1A-8. However, those skilled in the art will readily appreciate that the detailed description given herein with respect to these figures is for explanatory purposes as the invention extends beyond these limited embodiments.

FIG. 1A depicts a computing environment 100 with a cryptosystem 102 in accordance with one embodiment of the invention. Referring to FIG. 1A, the cryptosystem 102 includes an encryptor component 102A and decryptor component 102B. The encryptor component 102A can effectively use a transformation function (TF1) to encrypt data and generate and store the data in an encrypted form. As such, it will be appreciated that the encryptor component 102A can, for example, effectively apply the transformation function (TF1) to the data A (104A) to generate and store an encrypted form of the data A (104A) as the encrypted data A (106A), effectively apply the transformation function (TF1) to the data B (104B) to generate and store an encrypted form of the data B (104N) as the encrypted data B (106B) and so on.

Moreover, it will be appreciated that the one or more operations (OP1-OPN) can be applied to the encrypted data A (106A) and/or encrypted data B (106B) to get the modified (or result) encrypted data 108 which can be decrypted by the decryptor component 102B by using an inverse of the transformation function (TF1-inverse). In other words, one or more operations (OP1-OPN) can be performed on the encrypted form of data 106 to get modified (or result) encrypted data 108 (still in an encrypted form) which can be decrypted to get the same modified data as if the one or more operations (OP1-OPN) had been performed on the original (not encrypted) data 104. By way of example, assuming the encrypted data A (106A) represents a value X with an instance of it being equal to the positive number "144," the encryptor component 102A can use the transformation function (TF1) to get a decrypted value of X, for example, a value "87654078654". Various operations can then performed using the encrypted data ("87654078654") as it were the original data, for example, to calculate a function of X (e.g., 4× would be calculated as 4*87654078654) using the encrypted data to get a decrypted result (4*87654078654) that can be decrypted using the inverse of the transformation function to get the actual result of the function (4*144). The one or more operations (OP1-OPN) can, for example, be performed by another device and/or system 110 that need not know the transformation function (TF1) used to encrypt the data 104. Typically, device and/or system 110 has not been provided the transformation function (TF1) used to encrypt the data 104. As such, the one or more operations (OP1-OPN) can be performed on the encrypted data 106 without having to revile the actual content of the data 104. Yet, the result of the one or more operations (OP1-OPN) on the encrypted data 106 that is provided as the encrypted modified data 108 can be effectively transformed to obtain the actual (or unencrypted data) 112 result of the one or more operations (OP1-OPN) performed on the actual (or unencrypted data) 104. In other words, the cryptosystem 102 can provide Homomorphic and/or fully Homomorphic encryption, as those skilled in the art will readily appreciate.

Figure 1B:
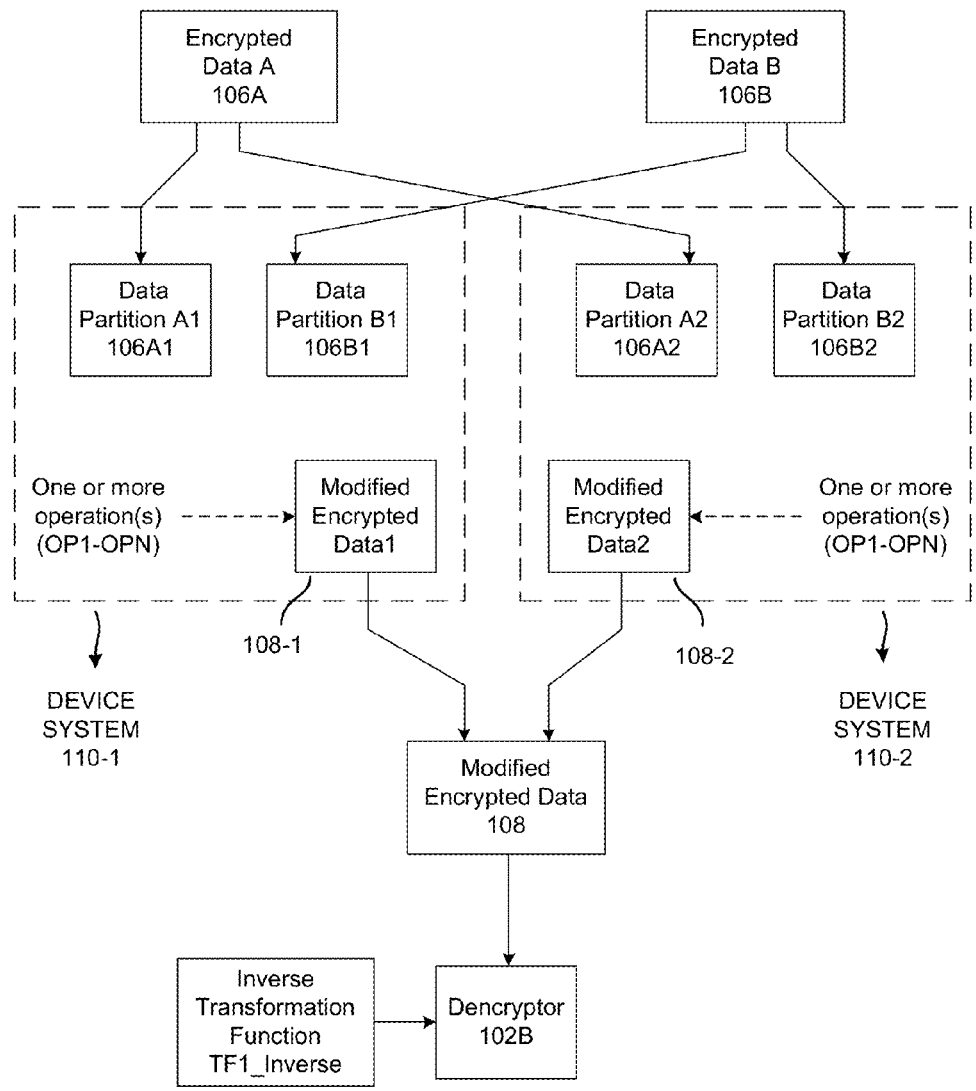
FIG. 1B depicts a computing environment in accordance with another embodiment of the invention.

FIG. 1B depicts a computing environment 150 in accordance with another embodiment of the invention. More particularly, FIG. 1B shows that the each one of the encrypted data 106A and 106B of FIG. 1A can be partitioned into at least two parts respectively (106A1, 106A2, 106B1, and 106B2). Typically, on two devices and/or systems 110-1 and 110-2, one or more operations (OP1-OPN) can be applied to one of the partitions of the encrypted data A (106A1) and/or encrypted data B (106B1) and also one or more equivalent operations (OP1-OPN) can be applied to the other partitions of the encrypted data A (106A2) and/or encrypted data B (106B2) to get the modified (or result) encrypted data 108-1 and 108-2 which can be combined to get the data 108 and then decrypted by the decryptor component 102B by using an inverse of the transformation function (TF1-inverse). Thus, the embodiment depicted in FIG. 1B shows that encrypted data can be partitioned and provided to two separate devices. It will be appreciated that this could allow for even more safety with respect to the encrypted data, especially when the devices can be chosen so that they operate without knowledge of each other and/or so they would not communicate the encrypted data with each other.

Referring to the environment 150 depicted in FIG. 1B, it will readily be appreciated that method for encryption/decryption can be provided in accordance with one embodiment of the invention. The method can, for example, include dividing the at least encrypted first data into two or more encrypted parts, sending each of the encrypted parts to a different device for performing the at least one operation on the encrypted part to get an encrypted result part, obtaining two or more encrypted result parts, combining the two or more encrypted result parts to get an encrypted complete result; and applying the inverse function to the encrypted complete result to get a decrypted result.

As will be described in greater detail below, those skilled in the art will also appreciate that to achieve Homomorphic and/or Fully Homomorphic encryption, the transformation function (TF1) can be selected as a function the satisfies at least linearity and convolution, for example, with respect to one or more operations (e.g., an algebraic operation, algebraic addition, algebraic multiplication, algebraic subtraction, algebraic division). Also, the cryptosystem 102 can be configured to provide various other applications, including, for example, public/private key encryption, signature schemes, storing and retrieving data stored in an encrypted form database.

Figure 2A:
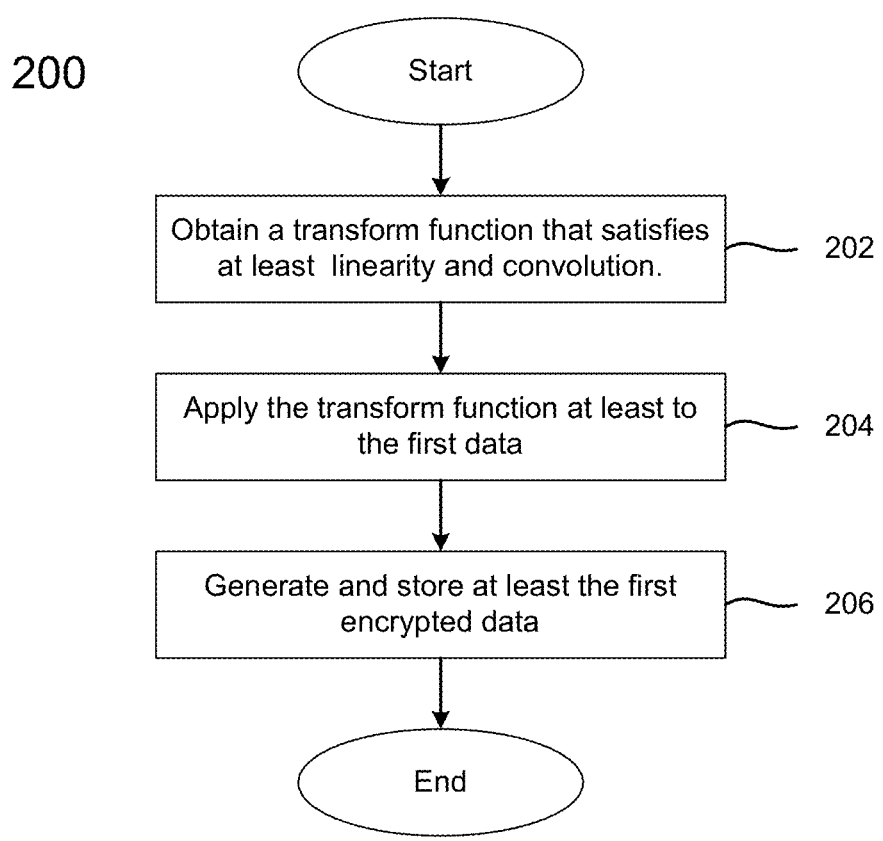
FIG. 2A depicts a method for encrypting data in accordance with one embodiment of the invention.

FIG. 2A depicts a method 200 for encrypting data in accordance with one embodiment of the invention. Method can, for example, be used by a device and/or computing system (e.g., encryptor 102A shown in FIG. 1A). Referring to FIG. 2A, initially, a transformation function that satisfies at least linearity and convolution is obtained (e.g., received, determined, located, retrieved) (202). Next, the transformation function is applied (204) to at least first data (e.g., content or digest of a message, a number). Thereafter, at least encrypted first data for the first data is to generated before the method 200 ends. Although not shown in FIG. 2A, it should be noted that encrypted first data can also be stored, for example, in a non-transitory computer readable storage medium (e.g., RAM memory, volatile memory, non-volatile memory, hard disk). It should also be noted that that encrypted first data can be sent or transmitted, for example, to another device and/or computing system configured to perform one or more operations on the encrypted data and send back the encrypted result of the operation(s) on the on the encrypted data.

Figures 2B, 2C:
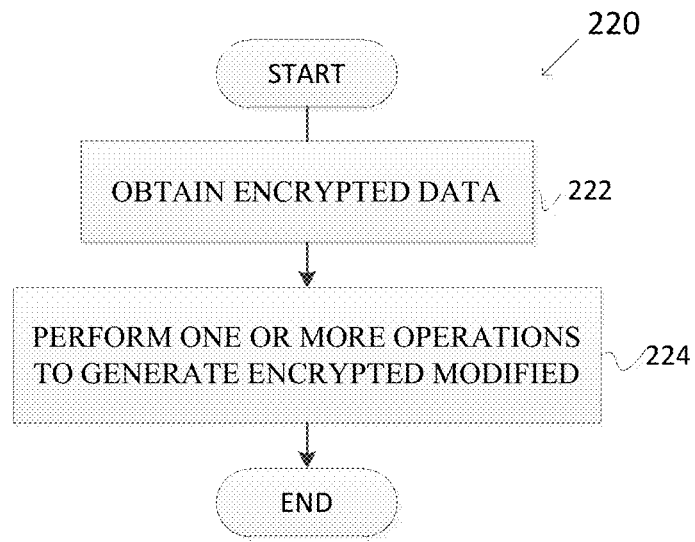
FIG. 2B depicts a method for performing one or more operations on encrypted data in accordance with one embodiment of the invention.
FIG. 2C depicts a method for decrypting data in accordance with one embodiment of the invention.

FIG. 2B depicts a method 220 for performing one or more operations on encrypted data in accordance with one embodiment of the invention. The operations can, for example, represent homographic operations performed on the encrypted data. Method can, for example, be used by a device and/or computing system (e.g., device and/or system 110 shown in FIG. 1). Referring to FIG. 2B, initially, at least one encrypted data is obtained (222). It should be noted that encrypted data has been encrypted using a transformation function that satisfies at least linearity and convolution. Next, one or more operations are performed to generate (224) encrypted modified (or result data) before the method 200 ends. Although not shown in FIG. 2B, it should be noted that encrypted modified data (or encrypted result) can also be stored, for example, in a non-transitory computer readable storage medium (e.g., RAM memory, volatile memory, non-volatile memory, hard disk). It should also be noted that encrypted modified data (or encrypted first result) can be sent or transmitted, for example, to another device or system configured to decrypt the encrypted modified data (or encrypted result) to obtain the result in a decrypted form.

FIG. 2C depicts a method 230 for decrypting data in accordance with one embodiment of the invention. Method can, for example, be used by a device and/or computing system (e.g., decryptor 102B shown in FIG. 1). Referring to FIG. 2C, initially, encrypted data is obtained (232). It should be noted that the encrypted data represents data that has been encrypted using a transformation function that satisfies at least linearity and convolution. Also, the encrypted data can represent result of one or more operations that have been performed on data that has been encrypted using a transformation function that satisfies at least linearity and convolution. In any case, an inverse of the transformation function is applied (234) to the encrypted data to obtain decrypted data (or data in the original form before the encryption) before the method 230 ends. The decrypted data can represent the original data or the result of one or more operations performed on the original data.

It will be appreciated that the encryption techniques can be used for various specific applications, including, for example, public & private key encryption and signature generation and verification functionality some transforms. Generally, other methods having the equivalent functionality can be constructed using the linearity and convolution properties of some transform. These transforms can, for example, be DFT, (P) NTT, ((Pseudo) Number theoretical transform), DHT (discrete Hartley transform), DCT (discrete cosine transform), multi-dimensional transforms, evaluation map and Lagrange transform, as well other many others that can be defined over various algebraic structures including groups, rings, polynomial rings and fields. Hence, the construction is valid in virtually any of these algebraic structures. For simplicity, hereinafter assume the ring $R=Z_n$ and T represents the DFT over R, unless it is otherwise specified.

Let n=pq be the modulus for some secret large primes p and q and note that generating large primes suitable for cryptography is known in the art and various methods are readily available for doing so today. Assume T is a transform defined by $\phi(t)$ satisfying the convolution and linearity property. For instance, if w is a primitive d-th root of unity in $$Z_n, \phi(t) = \prod_{i=0}^{d-1} (t - w^i) = t^d - 1$$

can define a d-point DFT satisfying the desired properties. Also note that DFT can support d-point cyclic convolution if and only if d divides gcd(p−1, q−1). Generating roots of unity in composite rings may not be easy, unless a careful construction is employed. For carefully chosen multiplies p and q, CRT could be used in generating the root of unity in $Z_n$. In other words non-trivial d-roots of unity roots in $Z_p$ and $Z_q$ could be found and combined using CRT to get a d-root of unity in $Z_n$.

Public Key Encryption

Public key encryption: Assume that d is a positive integer and w is a primitive d-th root of unity in $Z_n$ and defines a DFT map T supporting d-point cyclic convolution and linearity. Let (u(t), U(t)) and (s(t), S(t)) be a transform pairs such that $u(t):=u_0+u_1t+ \ldots +u_{d-1}t^{d-1}$; $s(t):=0+s_1t+ \ldots +s_{d-1}t^{d-1}$ are polynomials over $Z_n$ where $u_0$, $u_i$ and $s_i$ can be randomly generated for i=1, . . . , d−1. We can set n, $\phi(t)$, U(t) and S(t) as the public, and p, q and w as the secret parameters. Let $R_i(t)$ represents a polynomial with all its coefficients equal to some constant $R_i$ in $Z_n$:

$$R_i(t)=R_i+R_it+ \ldots +R_it^{d-1} \qquad (Eqn\ 5)$$

A public key encryption could be performed as follows (i.e., B encrypts a message m for A, which A decrypts): Method 1: Public key encryption:

Encryption: B should do the following:
1. Obtain A's authentic public key {n, U(t), S(t)};
2. Represent message as an integer m in [0, n−1].
3. Generate polynomials $R_0(t)$, $R_1(t)$ and $R_2(t)$ (see (5)).
4. $C(t)=U(t)+R_0(t)$
5. $C(t)=C(t)*C(t)$ mod $\phi(t)$
6. $C(t)=C(t)*S(t)$ mod $\phi(t)$
7. $C(t)=C(t)+R_1(t)$
8. $C(t)=C(t)*C(t)$ mod $\phi(t)$ 9. C(t)=m C(t) (i.e., a multiplication by a constant)
10. C(t)=C(t)+$R_2$(t)
11. C(t)=C(t)*S(t) mod $\phi$(t)
12. Send ciphertext C(t) to A.
1. Decryption: A uses the private key w and transform points to recover plaintext m: $T^{-1}$(C(t))=c(t)=$c_0$+$c_1$t+ . . . +$c_{d-1}$ $t^{d-1}$ mod n
2. computes m=$c_1(u_1^4 * s_1^3)^{-1}$ mod n.

Note that step 9 of the encryption method above can be equivalent to computing the point-wise product of C(t) with a polynomial M(t):=m+mt+$mt^2$+ . . . m $t^{d-1}$. Using convolution property, this computation is equivalent to convolving the scalar m with the time polynomial c(t).

Remark 1: In case of DFT, $\phi$(t) may not need to be published as a public key because knowing the degree of U(t) is enough to get $$\phi(t) = \prod_{i=0}^{d-1} (t - w^i) = t^d - 1.$$

However, for transforms having randomly chosen distinct evaluation points {$e_0, e_1, \ldots, e_{d-1}$}, $\phi$(t) can be published explicitly as a part of public key.

Remark 2: Method 1 above is an example of a public-key encryption that involves convolution operation. If the encryption does not require convolution operation, $\phi$(t) may not need to be published as a part of the public key. Example 6 below is a very simple example that can demonstrate how PKE can work.

Example 6

PKE with Artificially Small Parameters

Entity A chooses the primes p=1871, q=2011, and computes n=pq=3762581 and w=425649 defining a 5-point DFT over $Z_n$ having $\phi$(t)=$t^5$−1. After picking random numbers $u_0$=0, $u_1$=2239663, $u_2$=2700783, $u_3$=2215101, $u_4$=2609530, $s_1$=2279352, $s_2$=2411541, $s_3$=2188142 and $s_4$=1355116; entity A further computes $U(t):=T(u_0+u_1t+u_2t^2+u_3t^3+u_4t^4):=$DFT(2239663t+
2700783$t^2$+2215101$t^3$+2609530$t^4$)=777531+
1195862t+1908894$t^2$+557113$t^3$+3085762$t^4$
mod n $S(t):=T(s_0+s_1t+s_2t^2+s_3t^3+s_4t^4):=$DFT(0+2279352t+
2411541$t^2$+2188142$t^3$+1355116$t^4$)=708989+
371914t+3001468$t^2$+2598152$t^3$+844639$t^4$ mod n Entity A publishes n, U(t) and S(t) as the public parameters and keeps p, q, and w as private key. Encryption. To encrypt a message m=141123, B simply uses the encryption in Method 1. Firstly, B generates polynomials $R_0$(t)=1755225+ 1755225 t+1755225 $t^2$+1755225 $t^3$+1755225 $t^4$, $R_1$(t)=2148172+2148172t+2148172$t^2$+2148172$t^3$+ 2148172$t^4$ and $R_2$(t)=1121522+1121522t+1121522$t^2$+ 1121522$t^3$+1121522$t^4$ and computes the following through steps 4 to 11 (shown above in Method 1).
C(t)=U(t)+$R_0$(t)=232559+3269452 t+498744 $t^2$+1142727 $t^3$+3632643 $t^4$
C(t)=C(t)*C(t) mod $\phi$(t)=2377761+848615 t+582949 $t^2$+1778425 $t^3$+1600079 $t^4$
C(t)=C(t)*S(t) mod $\phi$(t)=3762322+3472853 t+1781804 $t^2$+65417 $t^3$+2205347 $t^4$
C(t)=C(t)+$R_1$(t)=2147913+1858444 t+167395 $t^2$+2213589 $t^3$+590938 $t^4$
C(t)=C(t)*C(t) mod $\phi$(t)=1646560+617197 t+2665680 $t^2$+553480 $t^3$+1485161 $t^4$
C(t)=m C(t)=1772063+704662 t+2147679 $t^2$+1339061 $t^3$+3326360 $t^4$
C(t)=C(t)+$R_2$(t)=2893585+1826184 t+3269201 $t^2$+2460583 $t^3$+685301 $t^4$
C(t)=C(t)*S(t) mod $\phi$(t)=259907+2880179 t+1029110 $t^2$+2569583 $t^3$+786383 $t^4$ and sends C(t) to the receiver.

Decryption. A gets the ciphertext and using the private parameters computes $$c(t):=IDFT(C(t)):=T^{-1}(259907+2880179t+\\1029110t^2+2569583t^3+786383t^4):=77979t+\\648717t^2+834761t^3+2461031t^4$$

and then extracts m=$c_1(u_1^4 s_1^3)^{-1}$ mod n=77979 ($2239663^4$ $2279352^3$)$^{-1}$=141123.

Figure 3:
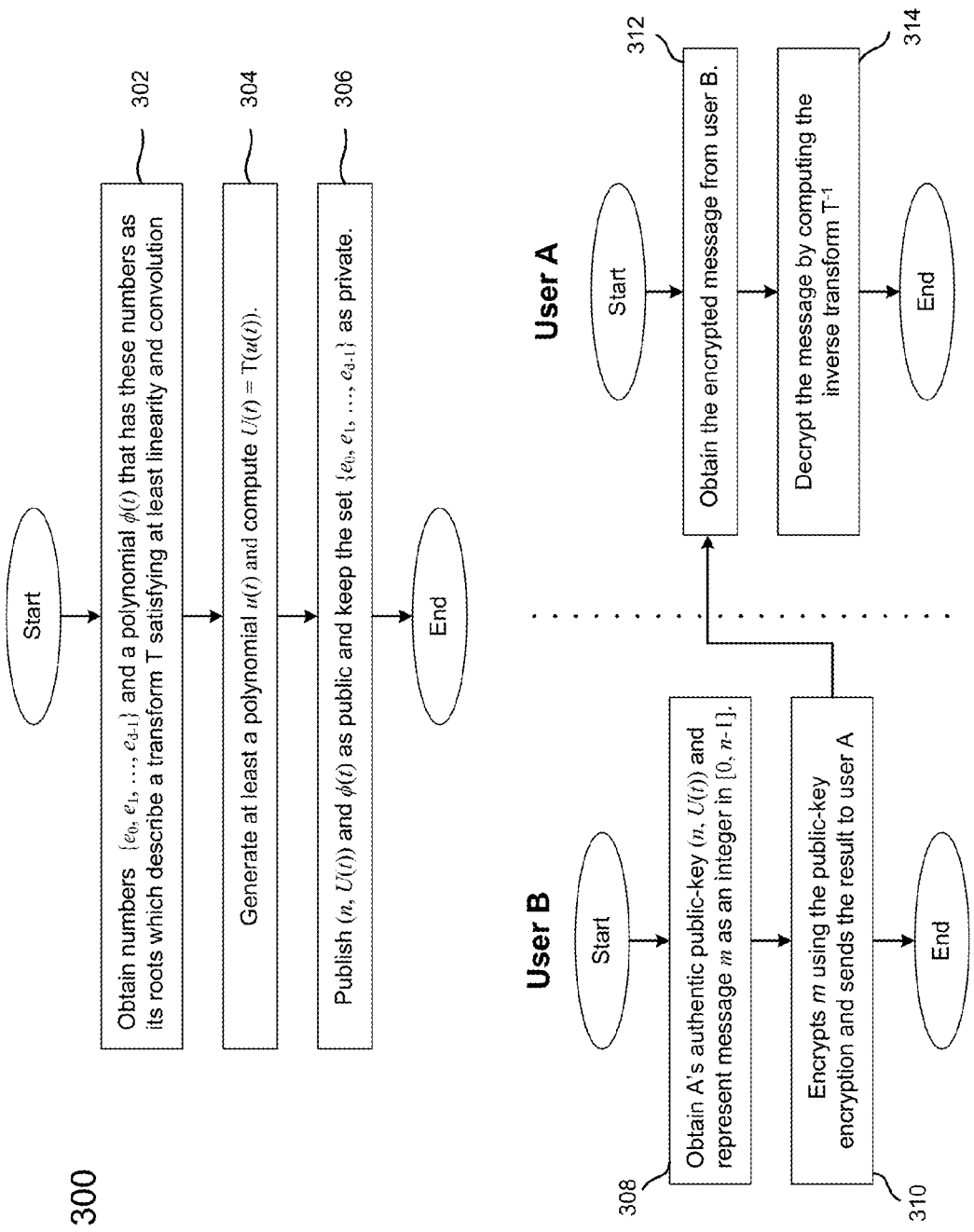
FIG. 3 depicts a public/private decryption environment 300 in accordance with embodiments of the invention.

FIG. 3 depicts a public/private decryption environment 300 in accordance with embodiments of the invention. Method 300 can, for example, be used by one or more devices and/or computing systems. Referring to FIG. 3, a method for public and private key generation can be carried (302,304,306) in accordance with one embodiment of the invention. The public key published (306) can, for example, include an encrypted data (304), a modulus and a polynomial, including one or more evaluation points as its roots (302). On the other hand, a private key that can be kept by the owner (306) can be the evaluation points effectively describing a transformation function that satisfies at least linearity and convolution.

FIG. 3 also depicts a method of public-key encryption in accordance with one embodiment of the invention. Referring to FIG. 3, an entity B, after obtaining another entity A's public-key (308) can represent a message as a value and encrypt this value and send to it entity A (310).

FIG. 3 further depicts a method of private-key decryption in accordance with one embodiment of the invention. In doing so, entity A receives at least one encrypted data by encrypted by A's public-key (312) which can be decrypted (314) by Entity A, for example, by a decryptor component, using an inverse of the transformation function (TF1-inverse) to obtain the result in a decrypted form.

In view of the foregoing, it will readily be appreciated that a method for performing a public key encryption scheme can be provided in accordance with one embodiment of invention, by using the published public key to encrypt a message; and performing one or more wrapping functions on the encrypted message to encrypt the message. The encrypted message can be sent to a receiver, and so on.

Homomorphic Operations

Note that a transform T satisfying linearity and convolution can define a homomorphism between the domain and range of the transform. This homomorphism can be used to provide a fully homomorphic cryptosystem in accordance with one aspect of the invention. First of all, transform T can be turned into a trapdoor one-way function by keeping the evaluation points secret. Evaluation points are the roots of the polynomial $\phi$(t), therefore $\phi$(t) can be secret or factoring $\phi$(t) can be hard. For example since general polynomial factorization over a modulus n=pq where p and q are large primes is hard, modulus n can be such a large composite number if needed.

In order to avoid known plaintext attacks to find the evaluation points, the messages might be masked with randomly generated numbers (or "blinding"). Moreover, some probabilistic encryption methods that give different ciphertexts for the same message may be used or else ciphertexts can be distributed to two or more separated device or computing system to avoid some system solvers and other lattice reduction methods.

The described construction allows homomorphic computation of both addition and multiplication on plaintexts. In other words, it respects the ring structure of the plaintexts. Note that homomorphic operations addition and multiplication can be induced from linearity and convolution properties of the transform respectively. Now, we some simple examples are discussed, other examples may also be easily derived. Assume that w is a primitive d-th root of unity in $Z_n$ and defines a d-point DFT map for $$\phi(t) = \prod_{i=0}^{d-1}(t - w^i) = t^d - 1.$$

Let $(u(t), U(t))$ and $(v(t), V(t))$ be a transform pairs such that:
$u(t):=u_0+u_1 t+ \ldots +(x+p\, u_k) t^k+ \ldots +(x+q\, u_{d-k}) t^{d-k}+ \ldots +u_{d-1} t^{d-1}$
$v(t):=v_0+v_1 t+ \ldots +(x+p\, v_k) t^k+ \ldots +(x+q\, v_{d-k}) t^{d-k}+ \ldots +v_{d-1} t^{d-1}$ can be polynomials over $Z_n$ hiding x and y respectively where $u_i$, $v_i$ can be random numbers for $i=0, 1, \ldots, d-1$. Note that we can select k in $[1, d-1]$.

Method 2: Homomorphic operations:
  Addition.
  1. $U(t):=T(u(t))$;
  2. $V(t):=T(v(t))$;
  3. $C(t):=U(t)+V(t)$;
  4. $T^{-1}(C(t))=c(t)=c_0+c_1\, t+ \ldots +(x+y+pc_k)\, t^k+ \ldots +(x+y+qc_{d-k})t^{d-k}+ \ldots +c_{d-1}\, t^{d-1}$
  5. extracts x+y from $(x+y+pc_k)$ mod p and $(x+y+qc_{d-k})$ mod q using CRT.
  Multiplication.
  1. $U(t):=T(u(t))$;
  2. $V(t):=T(v(t))$;
  3. $C(t):=U(t)*V(t)$ mod $\phi(t)$;
  4. $T^{-1}(C(t))=c(t)=c_0+c_1\, t+ \ldots +(xy+pc_k)\, t^k+ \ldots +(xy+qc_{d-k})t^{d-k}+ \ldots +c_{d-1}\, t^{d-1}$
  1. extracts xy from $(xy+pc_k)$ mod p and $(xy+qc_{d-k})$ mod q using CRT.

Remark 3: Observe that k gives the placement of $(1+pu_k)$ and $(1+qu_{d-k})$ terms in u(t). Hiding this value may increase the attackers work but this would not be significant. Hence, we keep k optionally secret parameter.

Yet another method can be provided for a system where ciphertexts can be divided and distributed to two or more separated device or computing system in accordance with one embodiment of the invention. Assume that w is a primitive d-th root of unity in $Z_{n^2}$ and defines a d-point DFT map for $$\phi(t) = \prod_{i=0}^{d-1}(t - w^i) = t^d - 1.$$

Let $(u(t), U(t))$ and $(v(t), V(t))$ be a transform pairs such that
  $u(t):=x+p\, q\, u_1 t+ \ldots p\, q\, u_{d-1}\, t^{d-1}$
  $v(t):=y+p\, q\, v_1 t+ \ldots +p\, q\, v_{d-1}\, t^{d-1}$
can be polynomials over $Z_{n^2}$ hiding x and y respectively where $u_i$, $v_i$ can be random numbers for $i=1, \ldots, d-1$.

Method 3: Homomorphic operations
  Addition.
  1. $U(t):=T(u(t))$;
  2. $V(t):=T(v(t))$;
  3. $C(t):=U(t)+V(t)$;
  4. $T^{-1}(C(t))=c(t)=c_0+c_1\, t+ \ldots +c_{d-1}\, t^{d-1}$
  5. extracts $c_0=x+y$.
  Multiplication.
  1. $U(t):=T(u(t))$;
  2. $V(t):=T(v(t))$;
  3. $C(t):=U(t) \bigotimes V(t)$;
  4. $T^{-1}(C(t))=c(t)=c_0+c_1\, t+ \ldots +c_{d-1}\, t^{d-1}$
  2. extracts $c_0=xy$.

Observe that steps of Method 3 can involve only component-wise additions or multiplications. Therefore, any function applied on the components can be carried independently or in parallel. This property allows dividing the ciphertexts and distributing it as two more portions respectively to two or more separated device or computing system. After that desired function can be applied to the partitions by separated systems and outcomes can be turned back to the user to deciphering final results.

Example 7

Homomorphic operations using Method 2. This very simple example can show how a complicated function (involving addition, multiplication and division) can be computed with encrypted data in accordance with one embodiment of the invention. Let a=144, b=117, c=320 and e=16, these values can be encrypted and the homomorphic property can be used to compute (ab+c)/e. Note that, with the described method calculations can take place in the ring $Z_n$, hence instead of e, its inverse $e^{-1}=2687596$ mod n could be used. Moreover, if regular integer arithmetic is targeted, (ab+c) need not exceed n and it should be divisible by e. Now, encrypt a, b, c and the $ie:=e^{-1}$ and perform the above calculation in the spectrum.

The sender can, for example, choose the primes p=1861, q=2011, and compute n=pq=3742471 and w=1729321 defining a 5-point DFT over $Z_n$, keeping p, q and w secret and publishing n as public. Moreover, since we use DFT, $\phi(t)=t^5-1$.

Homomorphic operations: A general term for d=5 and k=1 can be as follows, where x is the plaintext and $u_1, u_2, u_3$ and $u_4$ are some randomly generated numbers.
$u(t):=0+(x+pu_1)\, t+u_2\, t^2+u_3\, t^3+(x+qu_4)t^4$ time polynomials a(t), b(t), c(t) and ie(t) are computed as follows.
$a(t):=(144+1861 \cdot 1336610)t+3622025\, t^2+2073975\, t^3+(144+2011 \cdot 3231655)\, t^4 \equiv 2430610\, t+3622025\, t^2+2073975\, t^3+1928693\, t^4$ mod n
$b(t):=(117+1861 \cdot 1222319)t+3573989\, t^2+2411724\, t^3+(117+2011 \cdot 432885)\, t^4 \equiv 3055879\, t+3573989\, t^2+2411724\, t^3+2278580\, t^4$ mod n
$c(t):=(320+1861 \cdot 3227690)t+1611796\, t^2+650701\, t^3+(320+2011 \cdot 2355504)\, t^4 \equiv 65455\, t+1611796\, t^2+650701\, t^3+2693049\, t^4$ mod n
$ie(t):=(2687596+1861 \cdot 2130894)t+2700783 t^2+3466887 t^3+(2687596+2011 \cdot 1726922)t^4 \equiv 679614\, t+2700783\, t^2+3466887\, t^3+1932194\, t^4$ mod n.

By simply taking the transform, the sender can calculate the following spectral polynomials and sends them to a receiver or a server as used herein (e.g., a server computer).
$A(t):=2570361+1401847\, t+3563009\, t^2+1314573\, t^3+2377623\, t^4$
$B(t)=92759+532910\, t+1688078\, t^2+744862\, t^3+683862\, t^4$ $C(t)=1278530+1620144\ t+1350527\ t^2+824252\ t^3+2411489\ t^4$ $IE(t)=1294536+1788562\ t+1354501\ t^2+302001\ t^3+2745342\ t^4$.

The sender can asks the server to perform $(A(t)*B(t)+C(t))*IE(t)$ without knowing the plaintexts. The server starts with convolving $A(t)$ and $B(t)$ modulo $\phi(t) = t^5-1$ as described in Method 2, the cyclic convolution is computed as follows:
$A(t)*B(t)=3121515+3201187\ t+1261140\ t^2+3260262\ t^3+383309\ t^4$ Next, $A(t)*B(t)+C(t)$ is computed by simply adding two polynomials:
$A(t)*B(t)+C(t)=657574+1078860\ t+2611667\ t^2+342043\ t^3+2794798\ t^4$ Finally, $(A(t)*B(t)+C(t))*IE(t)$ needs another cyclic convolution given by:

$162629+2812093\ t+525489\ t^2+1682403\ t^3+2302328\ t^4\ \mathrm{mod}(t^5-1)$

Once the server performs all these calculations, it sends the result to sender. The sender takes the inverse transform giving:
$1326105\ t+3105489\ t^2+3446169\ t^3+3512279\ t^4$ and then extracts 1073 from $1073=1326105$ mod p and $1073=3558179$ mod q using CRT. In fact this is the result $(ab+c)/e=(144\cdot117+320)/16=1073$ the sender seeks for.

Next example demonstrates a NAND gate implementation using the homomorphic features of our cryptosystem. Since the NAND gate (operation) is functionally complete, it is sometimes called a "universal gate" from which any other logic gates can be built. From the digital electronics point of view of, functional completeness means that all logic circuits implementing a Boolean function can be assembled from a network of NAND gates.

Example 8

A Realization of a NAND Gate Using Method 2

In this example, we use the Lagrange interpolation as the transform for a cryptosystem in accordance with one embodiment of the invention. Let the system parameter be as in Example 3, i.e., $n=pq=7\cdot13=91$, $(e_0, e_1, e_2):=(3, 5, 11)$ and $\phi(t)=17+12\ t+72\ t^2+t^3$.

Assume that a, b are one bit binary variables and $e=1$; using the general term $u(t):=(x+pu_1)+(x+qu_2)\ t+u_2\ t^2$, in a cryptosystem, homomorphic properties can be exploited to compute $e-ab=1-ab=(a\ \mathrm{NAND}\ b)$. In other words, if $A(t)$, $B(t)$ and $E(t)$ represent the transforms pairs of $a(t)$, $b(t)$ and $e(t)$ respectively, then $Z(t):=E(t)-A(t)*B(t)\ \mathrm{mod}\ \phi(t)$ can be a transform pair of the polynomial $(e-ab+pu'_0)+(e-ab+qu'_1)\ t+u'_2t^2$ for some random $u'_i$ values. Therefore, it gives a homomorphic computation of $1-ab$ using CRT.

Let $e(t)=(1+7\cdot31)+(1+13\cdot9)t+65t^2=36+27t+65t^2\ \mathrm{mod}\ 91$ is a blinding polynomial for $e=1$. The Lagrange transform of $e(t)$ gives the ciphertext $E(t)=30+15t+26t^2$.

Table 1 shown below demonstrates the truth table for NAND gate realization. Note that for virtually all possible inputs a, b, we use different random values for blinding polynomials.

TABLE 1

NAND gate truth table

| a | 0 | 0 | 1 | 1 |
|---|---|---|---|---|
| a(t) | $(0 + 7 \cdot 70) +$ $(0 + 13 \cdot 14)\ t + 12t^2$ | $(0 + 7 \cdot 17) +$ $(0 + 13 \cdot 32)\ t + 70t^2$ | $(1 + 7 \cdot 36) +$ $(1 + 13 \cdot 47)t + 8t^2$ | $(1 + 7 \cdot 34) +$ $(1 + 13 \cdot 62)t + 85t^2$ |
| A(t) | $16 + 54t + 65t^2$ | $32 + 21t + 33t^2$ | $48 + 35t + t^2$ | $28 + 21t + 67t^2$ |
| b | 0 | 1 | 0 | 1 |
| b(t) | $(0 + 7 \cdot 34) +$ $(0 + 13 \cdot 26)\ t + 80t^2$ | $(1 + 7 \cdot 88) +$ $(1 + 13 \cdot 72)\ t + 55t^2$ | $(0 + 7 \cdot 90) +$ $(0 + 13 \cdot 39)\ t + 52t^2$ | $(1 + 7 \cdot 17) +$ $(1 + 13 \cdot 72)t + 77t^2$ |
| B(t) | $29 + 52t + 16t^2$ | $5 + 12t + 64t^2$ | $71 + 59t + 2t^2$ | $4 + 20t + 17t^2$ |
| a NAND b | 1 | 1 | 1 | 0 |
| $A(t) * B(t)$ mod $\phi(t)$ | $76 + 64t + 6t^2$ | $24 + 70t + 23t^2$ | $23 + 3t + 12t^2$ | $19 + 48t + 24t^2$ |
| $Z(t) = E(t) - A(t) * B(t)$ | $45 + 42t + 20t^2$ | $6 + 36t + 3t^2$ | $7 + 12t + 14t^2$ | $11 + 58t + 2t^2$ |
| $T^{-1}(Z(t))$ | $78 + 27t + 15t^2$ | $50 + 79t + 37t^2$ | $78 + 53t + 13t^2$ | $21 + 78t + 72t^2$ |
|  | 1 | 1 | 1 | 0 |
| Using CRT | (1 ≡ 78 mod 7, 1 ≡ 27 mod 13) | (1 ≡ 50 mod 7, 1 ≡ 79 mod 13) | (1 ≡ 78 mod 7, 1 ≡ 53 mod 13) | (0 ≡ 21 mod 7, 0 ≡ 78 mod 13) |

Example 9

Homomorphic Operations Using Method 3

In this example, we will compute the same function with the same inputs as in Example 7 using Method 3. Let $n=p^2q^2=11^2\cdot31^2=116281$, $w=2550$ defining a 5-point DFT over $Z_{n^2}$. Let $a=144$, $b=117$, $c=320$ and $e=16$; we encrypt these values and exploit the homomorphic property to compute $(ab+c)/e$.

First using the general term $u(t):=x+pqu_1\ t+pqu_2\ t^2+pqu_3\ t^3+pqu_4\ t^4$ for a value x, polynomials $a(t)$, $b(t)$, $c(t)$ and $ie(t)$ are computed as follows.

$a(t):=144+(11\cdot31\cdot57519)t+(11\cdot31\cdot17314)t^2+$
$(11\cdot31\cdot97198)t^3+(11\cdot31\cdot92068)t^4 \equiv 144+78771\ t+90024\ t^2+4433\ t^3+115599\ t^4$ mod n $b(t):=117+(11\cdot31\cdot59509)t+(11\cdot31\cdot85559)t^2+$
$(11\cdot31\cdot86104)t^3+(11\cdot31\cdot84042)t^4 \equiv 117+59675\ t+105369\ t^2+58652\ t^3+53196\ t^4$ mod n $c(t):=320+(11\cdot31\cdot88103)t+(11\cdot31\cdot100143)t^2+$
$(11\cdot31\cdot69296)t^3+(11\cdot31\cdot29884)t^4 \equiv 320+42625\ t+78430\ t^2+24893\ t^3+73997\ t^4$ mod n ie(t):=98988+(11·31·37836)t+(11·31·26320)$t^2$+
(11·31·94738)$t^3$+(11·31·98988)$t^4$≡98988+111166
t+21483 $t^2$+95821 $t^3$+33418 $t^4$ mod n.

By simply taking the transform, the sender may calculate the following spectral polynomials and can send different coefficients to two or more separated device or computing system. For instance coefficients 1 & 2 can be sent to one server and remaining can be sent to another server.

A(t):=56409+96306 t+45497 $t^2$+30834 $t^3$+4236 $t^4$
B(t)=44447+95256 t+106509 $t^2$+88095 $t^3$+15121 $t^4$
C(t)=103984+50788 t+48742 $t^2$+87957 $t^3$+58972 $t^4$
IE(t)=80199+38938 t+106456 $t^2$+20183 $t^3$+8589 $t^4$

The sender can ask both servers to perform Z(t)=(A(t)⊗B(t)+C(t)) ⊗IE(t) on their received coefficients without knowing the plaintexts. The servers can start with multiplying the coefficient of A(t) and B(t) component-wisely as described in Method 3:

TABLE 2

Homomorphic operations using method 3

|  | Server 1 | | Server 2 | | |
|---|---|---|---|---|---|
|  | 1st coeff. | 2nd coeff. | 3rd coeff. | 4th coeff. | 5th coeff. |
| A(t) ⊗ B(t) | 76182 | 83684 | 61860 | 113351 | 98006 |
| A(t) ⊗ B(t) + C(t) | 63885 | 18191 | 110602 | 85027 | 40697 |
| Z(t) | 55974 | 53587 | 97576 | 24943 | 5847 |

Once both servers perform all of these calculations on the received coefficients, they can send the results to sender. The sender can combine the received values from the server and takes the inverse transform giving:

1073+47058 t+33077 $t^2$+109802 $t^3$+97526 $t^4$ and then extract the result from the first coefficient $c_0$=1073. In fact, this is the result (ab+c)/e=(144·117+320)/16=1073 that the sender seeks.

Signature Scheme

The encryption functions can be modified to derive a signature scheme in accordance with one embodiment of the invention. As before, assume that w is a primitive d-the root of unity in $Z_n$ and defines a DFT map T supporting d-point cyclic convolution and linearity. n can be set as the public, and p, q, w and (optionally) k as the secret parameters for the signature generation. Note that in the signature scheme; φ(t) does not need to be published as a public-key since it may not be needed in verification. In fact, signature generation for other transforms can be different. Method 4 is an example for DFT transform. On the other hand, Remark 3 above can still be valid for k being optionally secret.

Let l=⌊(d−1)/2⌋, 1≤k≤l and $H_m$ be a digest of a message m. We generate s(t):=$s_0$+$s_1$ t+ . . . +($H_m$−1)$s_k$ $t^k$+ . . . +($H_m$+1)$s_{d-k}$ $t^{d-k}$+ . . . +$s_{d-1}$ $t^{d-1}$ as a polynomial over $Z_n$ where $s_i$ can be random numbers for i=0, 1, . . . , d−1 except the d−k entry; i.e. $s_{d-k}$=$s_k^{-1}$ mod n. We can select k in (0, d−1) but k≠d/2 in case d is even. The signature pair (S(t), v) can be calculated as follows:

Method 4: Signature Scheme
Signature.
1. S(t):=DFT(s(t))
2.
$$v := s_0^2 - 2s_k s_{d-k} + \sum_{i=1}^{d-1} s_i s_{d-i} \mod n$$
3. return (S(t), v)

Verification.
1. Z(t):=S(t) ⊗ S(t);
2. $z_0$:=$d^{-1}$Z(1) mod n;
3. v':=$z_0$−2$H_m^2$ mod n
4. if v'=v then verify otherwise reject.

Observe that in Step 3, the verification can require the computation of $z_0$, which is the zeroth term of the time polynomial. In fact, this computation may need a partial inverse DFT transform calculation. Since verifier knows $w^0$=1, it is possible to compute $z_0$ by simply computing $d^{-1}$Z(1) mod n. In order to propose a similar signature scheme for other transforms (e.g. the Lagrange transform), one of the evaluation points may need to be published and signature and verification could be revised accordingly.

Example 10

Sign and Verification with Artificially Small Parameters

The signer chooses the primes p=1871, q=2011, and computes n=pq=3762581 and w=425649 defining a 5-point DFT over $Z_n$. The signer publishes n as the public parameter and keeps p, q, w and (optionally) k as private key. Note that by selecting k=1 we hide the $H_m$ information on first and fourth coefficients. The signature calculation follows as shown above.

Signature generation: After picking random numbers $s_0$=2239663, $s_1$=1948283, $s_2$=3072660, $s_3$=1128269 and $s_4$=$s_1^{-1}$ mod n=3636717, signer computes the signature (S(t),v) for a hash value $H_m$=442738 as follows.

S(t)=T($s_0$+($H_m$−1)$s_1$ t+$s_2$ $t^2$+$s_3$ $t^3$+($H_m$+1)$s_4$ $t^4$)=DFT (2239663+1513740 t+3072660$t^2$+1128269 $t^3$+2685695 $t^4$)=3114865+2560068 t+3241972 $t^2$+2256897 $t^3$+24513 $t^4$ and v:=$s_0^2$−2$s_1 s_4$+2$s_2 s_3$ mod n=629965

The sender sends the signature (S(t),v) along with the message m. Verifier carries the following steps in validating the signature.

Signature verification: First, the verifier can calculate the digest $H_m$=44238 of the message m and compute Z(t) by simply carrying the component-wise multiplication Z(t):=S(t) ⊗ S(t).

Z(t)=709994+2385249 t+3733708$t^2$+1327602 $t^3$+2636790 $t^4$

In fact, this computation corresponds to auto-correlation of the signal s(t). Next, compute the constant coefficient, $z_0$ of the time polynomial z(t). Since the first evaluation point $w^0$=1 is known, we may get $z_0$ by simply computing $d^{-1}$Z(1) where Z(1) is the evaluation of Z(t) at t=1 which is $w_0$=3663701 mod n. Thus, v'=3663701−2·$442738^2$=629965 mod n=v which can verify the signature.

Figure 4A:
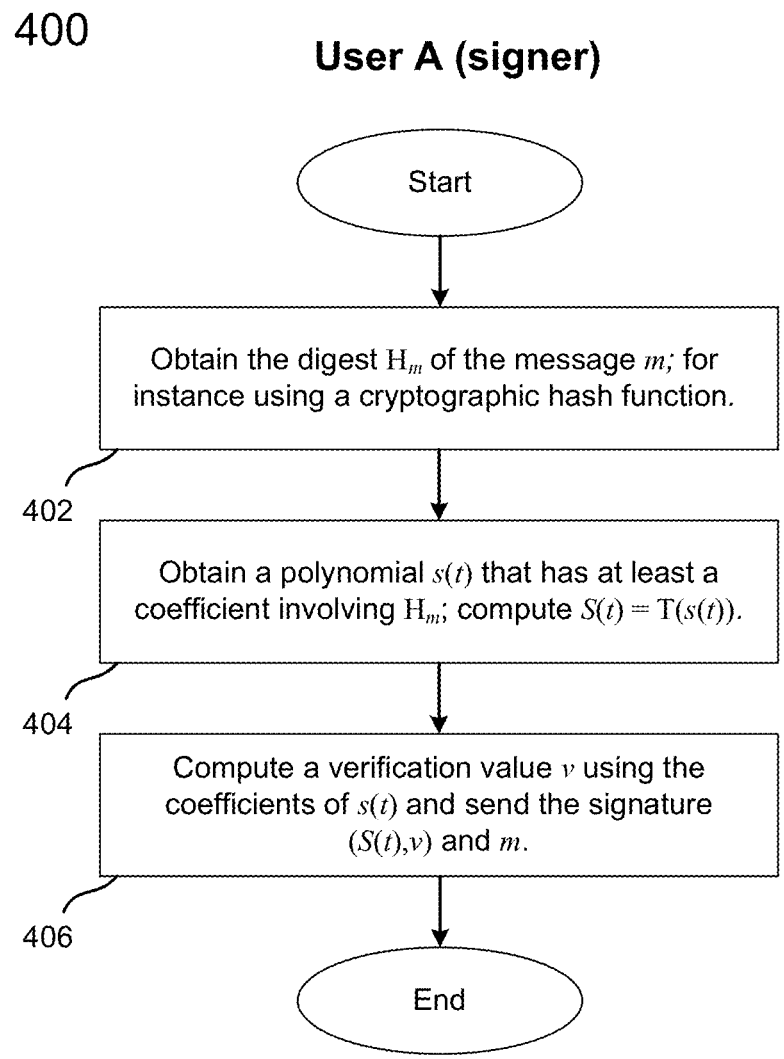
FIG. 4A depicts a method for signing a message in accordance with one embodiment of the invention.

FIG. 4A depicts a method 400 for signing a message in accordance with one embodiment of the invention. Method can, for example, be used by a device and/or computing system. Referring to FIG. 4A, initially, a digest of a message is obtained (402). The signer can obtain data that at least one of its components includes the digest value and can compute the encrypted data (404) using a transformation function that satisfies at least linearity and convolution. Moreover, the signer can obtain a verification value using the coefficients of the data, including the digest value (406) and send or publish both the encrypted data (404) and verification value (406).

Figure 4B:
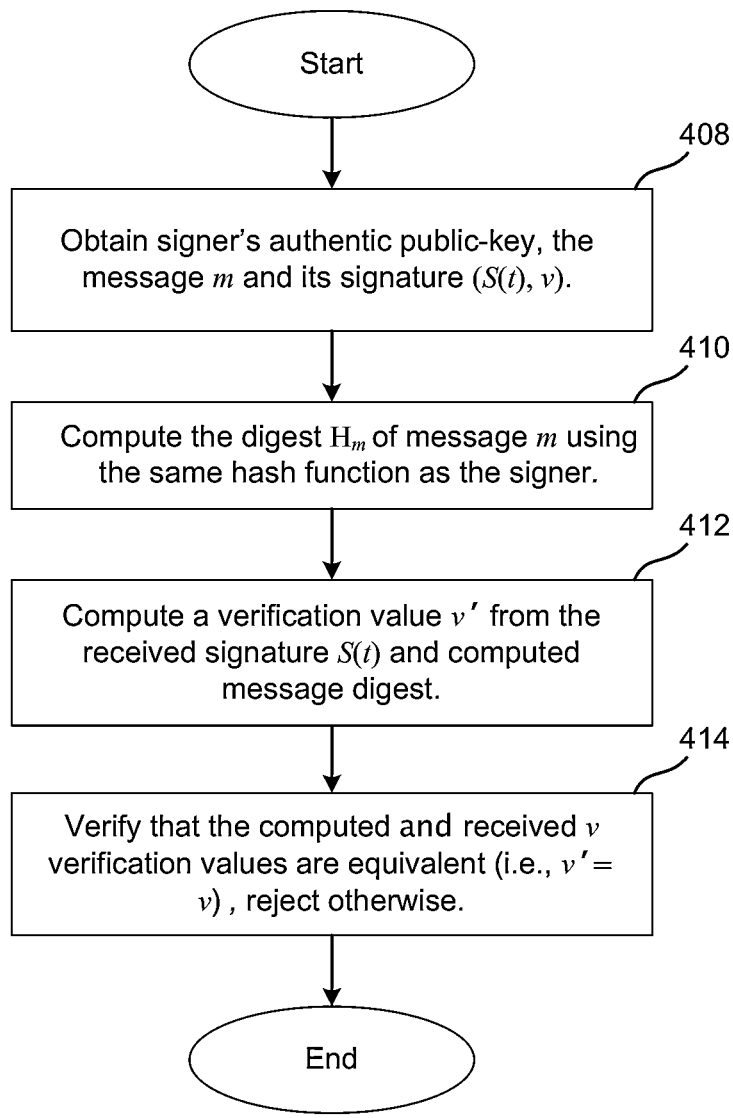
FIG. 4B depicts a method for verifying a signature in accordance with one embodiment of the invention.

FIG. 4B depicts a method 407 for verifying a signature in accordance with one embodiment of the invention. Referring to FIG. 4B, a verifier B, after obtaining another entity A's public-key, message and the signature (408) computes the digest of the message using the same method as the signer (410). Next, the verifier can calculate a verification value form the received encrypted data (404) and the message digest is computed (410). The verifier can then compare the received verification value (computed in 406 and 412). As a result, the verifier can accept the signature if these two values equal or reject it if two values are not equal (414).

In view of the foregoing, it will readily be appreciated that a signature scheme can be provided in accordance with one embodiment of the invention, by using one or more coefficients of the transformation function to generate a signature, wherein at least one part of the signature includes: (i) an encrypted digest obtained by using a digest of a message that is inserted in at least one coefficients of the data to encrypted, and (ii) value obtained by performing one or more calculations on the data to be encrypted.

Querying

A querying machine compromising the functionally complete logic gates can be build using the homomorphic properties of the described cryptosystem in accordance with one exemplary embodiment of the invention. Another example of querying can be derived from the idea that is used in signature and verification generation. To be more specific, in verification, we can exploit the fact that verifier knows one of the evaluation points i.e., $w^0=1$ in case of DFT. Using this knowledge, the verifier can get a spectral polynomial (as a part of the signature) and the zeroth term of the corresponding time polynomial can be computed.

Since there is no need to hide the plaintext in the time coefficient corresponding to the known evaluation point, direct zeroth term computation does not reveal virtually any information about the plaintext. However, by convolution property, coefficients having the plaintext information can be shifted towards the zeroth term. In fact, the computation $Z(t):=S(t) \otimes S(t)$ in Step 1 of the verification method corresponds to this shifting and use of the information shifted to this term. A similar methodology can be used in querying encrypted data without the need for decryption. For instance, a database/cloud which is capable of performing several homomorphic operations on encrypted data is a good candidate for such a scenario.

Consider again the DFT case and assume that w is a primitive d-th root of unity in $Z_n$ and defines a DFT map T supporting d-point cyclic convolution and linearity. As before, set n and $\phi(t)$ as the public, and p, q, w and (optionally) k as the secret parameters for encryption. Note that Remark 1 and 3 can both be valid in this case. Assume that a user encrypts a database with our cryptosystem after packing (i.e. inserted to time polynomials) the database entries using a general term:

$u(t):=u_0+u_1 t+ \ldots +(x+p\ u_k) t^k+ \ldots +(x+q\ u_{d-k}) t^{d-k}+ \ldots +u_{d-1} t^{d-1}$ where x is the plaintext and $u_i$'s are randomly generated numbers for all $0 \leq i \leq d-1$. Let the user send this encrypted database having spectral polynomial entries to a server/cloud. Assume that with the user's control, the server/cloud performs several homomorphic operations on the encrypted entries. Observe that while performing these operations, the server/cloud would not know anything about the content of the data. After a while the initially uploaded data would naturally be manipulated through user's will.

However, at some point the user might want to query the database for some records. For instance; the user might want to search for x=a in the database. Method 5 demonstrates how such a search query could be realized using our cryptosystem.

Method 5: Search query

Generating query: let $h_i$ and $v_i$ be randomly generated numbers for all $0 \leq i \leq d-1$.

1. $H(t):=T(h_0+h_1 t+ \ldots +(0+p\ h_k) t^k+ \ldots +(0+q\ h_{d-k}) t^{d-k}+ \ldots +h_{d-1} t^{d-1})$;

2. $V(t):=T(v_0+v_1 t+ \ldots +(a+p\ v_k) t^k+ \ldots +(a+q\ v_{d-k}) t^{d-k}+ \ldots +v_{d-1} t^{d-1})$;

3. return (H(t),V(t));

Search: for all entry U(t) in the database

1. $A(t):=V(t)-U(t)$;
    2. $S(t):=A(t) \otimes A(t)$;
    3. $G(t):=H(t) \otimes H(t)$;
    4. $Y(t):=(\Delta(t)*\Delta(t)) \otimes (H(t)*H(t)) \mod \phi(t)$;
    5. $Z(t):=\Delta(t) \otimes H(t)$;
    6. $c:=S(1)\ G(1)\ d^{-2}+2Y(1)\ d^{-1} \mod n$;
    7. $c':=2(Z(1)\ d^{-1})^2 \mod n$;
    8. if c=c' then store U(t)
    9. jump to next entry
    10. return the stored entries.

The user can generate the query (H(t),V(t)) for searching x=a in the database and sends it to the server/cloud. The cloud runs the search method for all U(t) in the database and returns the list of the records which satisfy c=c'.

Example 11

Search Query with Artificially Small Parameters

In this example, it is shown that a search query cam be carried with encrypted data. Starting with the system parameters, the user can choose, for example the primes p=1861, q=2011, and computes n=p q=3742471 and w=2987663 defining a 5-point DFT over $Z_n$. Now take k=2 and let the plaintexts are inserted to the second and third coefficients of a time polynomial $u(t):=0+u_1 t+(x+pr_2)t^2+(x+qr_3)t^3+u_4 t^4$ Assume that a user initially encrypts a database and sends it to, for example, a server/cloud using the above packing and our encryption function. Let the database operate in the server/cloud for a period of time and its entries are manipulated with several homomorphic operations as seen in Table 2.

TABLE 3

A column of the manipulated database in the server/cloud

[2494978, 2163299, 3536516, 671684, 2360936]
[2655484, 2560928, 1023692, 3154205, 1833104]
[608017, 2300913, 733095, 3016058, 826859]
[3508073, 620700, 3422910, 3067081, 608649]

Generating the query: assume the user wants to search for x=212 in database. First, the user needs to calculate H(t) and V(t) as described in Method 5. For random numbers $h_1=1110458$, $h_2=2291988$, $h_3=3186671$, $h_4=2326130$, $v_1=1512298$, $v_2=2877677$, $v_3=2017136$ and $v_4=2406981$, H(t) and V(t) are computed as follows.

$H(t):=T(1110458t+(0+1861 \cdot 2291988)t^2+(0+2011 \cdot 3186671)t^3+2326130t^4)=DFT(1110458$ t+2715199 $t^2$+1285029 $t^3$+2326130 $t^4$ mod n)=3694345+2865077 t+1837671 $t^2$+2472208 $t^3$+358112 $t^4$ V(t):=T(1512298t+(212+1861·2877677)$t^2$+(212+2011·2017136)$t^3$+2406981$t^4$)=DFT(1512298 t+3623579$t^2$+3364615 $t^3$+2406981 $t^4$ mod n)=3422531+1465636t+3303630 $t^2$+76594 $t^3$+2959022 $t^4$ By sending (H(t), V(t)), the user requires a database search for x=212 form the server/cloud.

Searching the database: After receiving (H(t), V(t)), the server/cloud performs the following operations on all of the database entries and returns the search results to the user. For instance the following U(t) corresponding to the first row in the database:

U(t)=2494978+2163299t+3536516$t^2$+671684 $t^3$+2360936 $t^4$

Δ(t)=927553+3044808 t+3509585 $t^2$+3147381 $t^3$+598086 $t^4$

S(t):=1652090+2853193 t+3741735 $t^2$+789725 $t^3$+1485216 $t^4$

G(t):=3264798+1431478 t+1027507 $t^2$+1717519 $t^3$+950787 $t^4$

Y(t):=881711+2773288 t+1524288 $t^2$+3049995 $t^3$+803238 $t^4$ mod φ(t)

Z(t):=778410+3030991 t+2422699 $t^2$+1546206 $t^3$+158302 $t^4$

From these calculations, the following can be obtained:

c:=S(1) G(1) $d^{-2}$+2Y(1) $d^{-1}$ mod n=3037017·907147·2844278+2·1547578·2993977 mod n=802084 c':=2(Z(1) $d^{-1})^2$ mod n=2 (451666·2993977)$^2$ mod n=3449581≠c

Since c≠c', this is not a match, the server jumps to the next entry and performs the same calculations for the next record. We simply give the c and c' calculation for the rest of the database entries.

| c | c' | Match |
|---|---|---|
| 802084 | 3449581 | No |
| 819181 | 55039 | No |
| 2772025 | 2772025 | Yes |
| 961396 | 3365145 | No |

Hence, the server can send the records corresponding to the matched entry

U(t)=608017+2300913t+733095$t^2$+3016058 $t^3$+826859 $t^4$ to the user. When the user receives the record, the user can decrypt it as:

2375254t+3418869 $t^2$+2771370 $t^3$+3269937 $t^4$ and then extract x=212 from 212=3418869 mod p and 212=2771370 mod q using CRT.

On the other hand, if the user acquires the whole encrypted database from the server and decrypts it using the private values, the resulting view would be as shown in table 4.

TABLE 4 the view of the decrypted database

| | | |
|---|---|---|
| . | | . |
| . | | . |
| . | | . |
| 312 | ↔ | [2494978, 2163299, 3536516, 671684, 2360936] |
| 312 | ↔ | [2655484, 2560928, 1023692, 3154205, 1833104] |

TABLE 4-continued the view of the decrypted database

| | | |
|---|---|---|
| 212 | ↔ | [608017, 2300913, 733095, 3016058, 826859] |
| 6047 | ↔ | [3508073, 620700, 3422910, 3067081, 608649] |
| . | | . |
| . | | . |
| . | | . |

Figure 5:
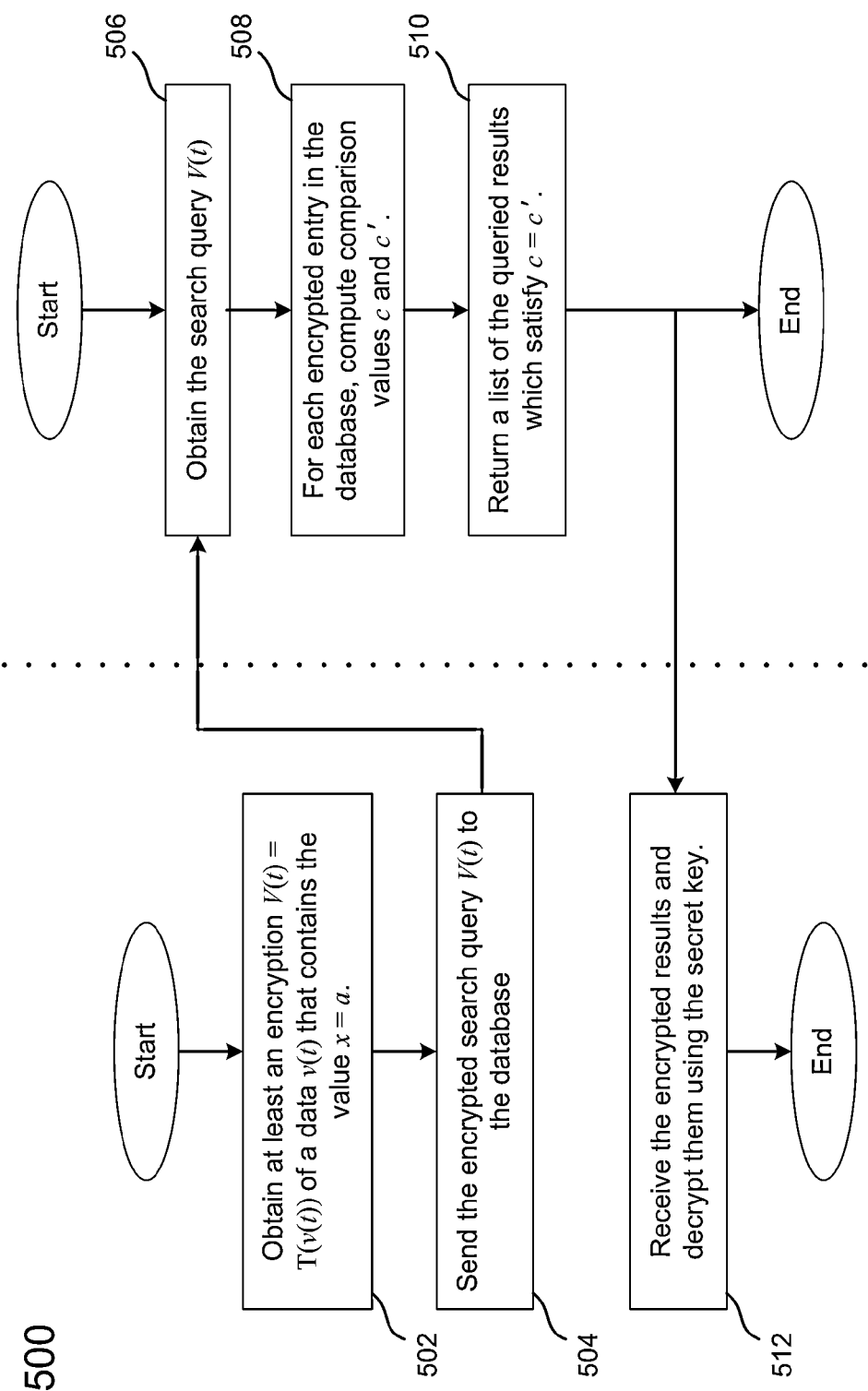
FIG. 5 depicts a method 500 for querying a database in accordance with one embodiment of the invention.

FIG. 5 depicts a method 500 for preforming a search or a query over an encrypted database or a storage system in accordance with one embodiment of the invention. Method 500 can, for example, be used by a device and/or computing system. Referring to FIG. 5, initially, in an encryption of a data pertaining the value to be searched is obtained (502) and sent to the database or storage system (504), for example, by a user. After obtaining the search query (506), the database or storage system can go through all the stored encrypted entries and compute some comparison values using the received encrypted data and encrypted entry (508). Thereafter, the database or storage system can return a list of the results that satisfy the comparison calculation to the query (510). After getting the query results, the results can be decrypted using the secret key (512) for example, by a user.

In view of the foregoing, it will readily be appreciated that a searching or querying method for querying encrypted or modified data in an encrypted database can be provided in accordance with one embodiment of the invention, by providing an encrypted value for a value to be searched in the encrypted database, comparing the encrypted value with encrypted values stored in the encrypted database, and returning one or more matched entries of the encrypted database associated with one or more matching encrypted values stored in the data encrypted.

Figure 6:
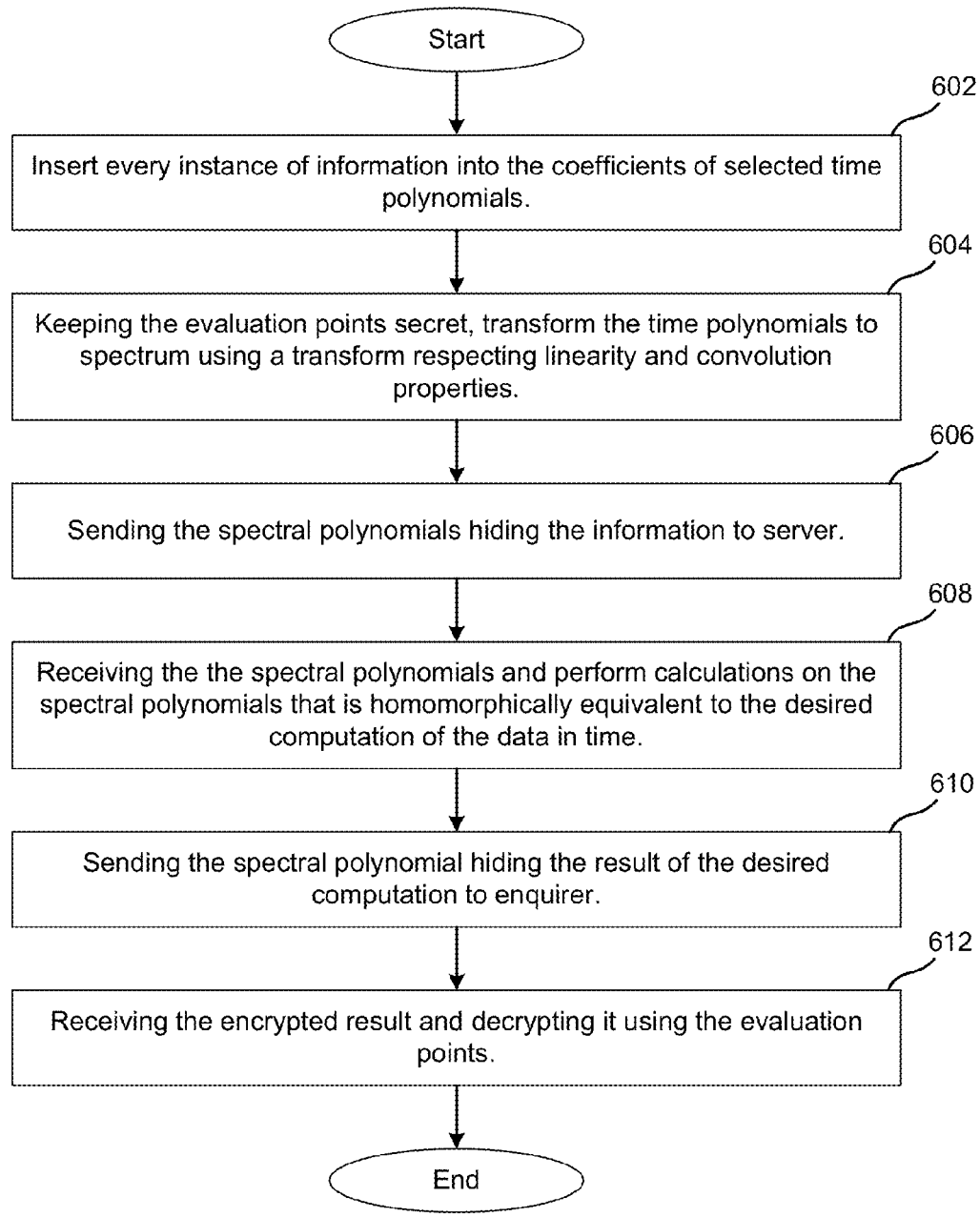
FIG. 6 depicts a homomorphic encryption scheme in accordance with one embodiment of the invention.

To elaborate even further, FIG. 6 depicts a method 600 for using a homomorphic encryption scheme in accordance with one embodiment of the invention. Referring to FIG. 6, an enquirer inserts every instance of information into the coefficients of selected time polynomials (602). The enquirer can keep the evaluation points secret, encrypt or transform the time polynomials to a corresponding spectrum, using a transform respecting linearity and convolution properties (604) and send the resulting spectral polynomials hiding the information to an entity, for example, a server or cloud system (606). Consequently, the entity can receive the spectral polynomials and perform calculations on the spectral polynomials that is homomorphically equivalent to the desired computation of the data in the time polynomial (608), and send back the resultant spectral polynomial hiding the result of the desired computation to the enquirer (610). After receiving the resultant encrypted data, the enquirer can decrypt it using the evaluation points.

Figure 7:
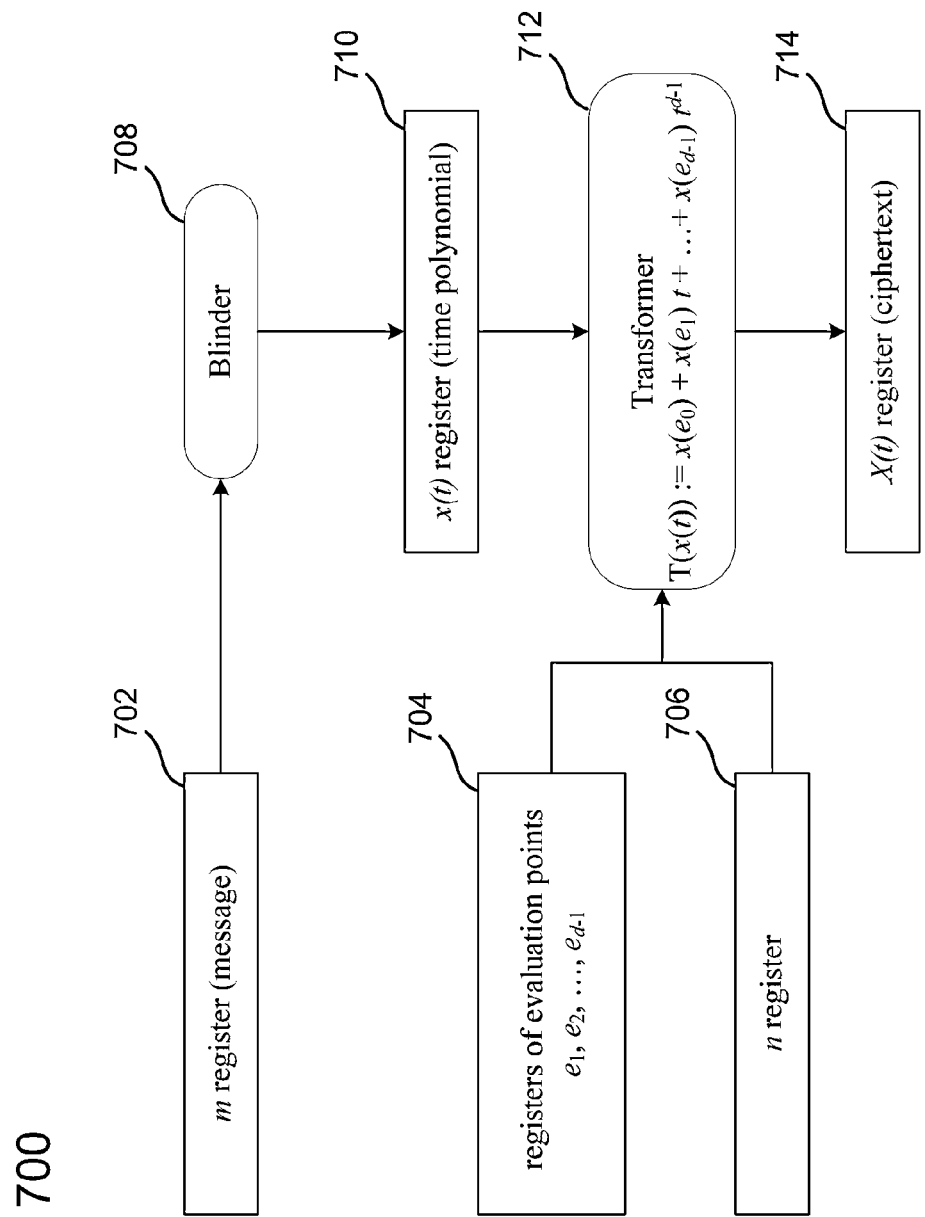
FIG. 7 depicts a method of encryption scheme in accordance with one embodiment of the invention.

FIG. 7 depicts a method of encryption scheme 700 in accordance with one embodiment of the invention. Referring to FIG. 7, initially, a message stored, for example, in a register of a computer system can be blinded (702), for example, by adding a random number (708) and inserted into at least one of coefficients of a time polynomial (710) and encrypted using a transform function having at least a modulus (706). In addition, evaluation points can be set (704) as inputs to a transformer (or transforming function) respecting linearity and convolution properties (712). The result of the transforming function gives the encrypted data or the ciphertext (714).

Figure 8:
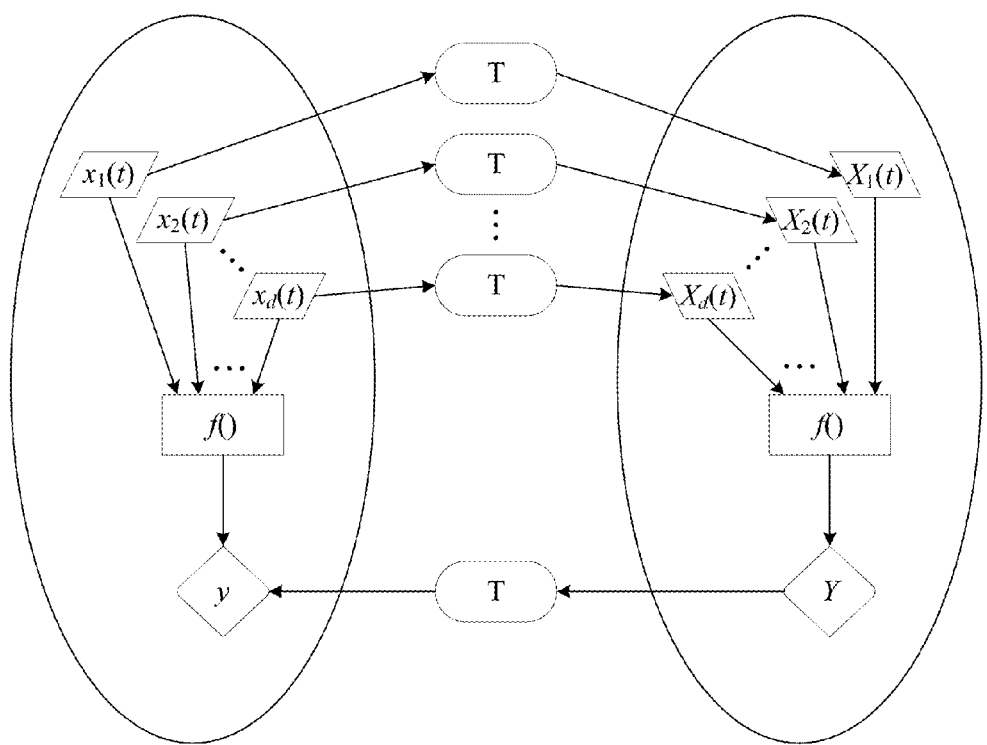
FIG. 8 depicts a homomorphic encryption scheme that can be provided in accordance with one embodiment of the invention.

FIG. 8 depicts a homomorphic encryption scheme 800 that can be provided in accordance with one embodiment of the invention. More particularly, as those skilled in the will readily appreciate. FIG. 8 shows a set of data that is encrypted using a transform function f( ) respecting linearity and convolution properties. FIG. 8 also shows that the result of a function f( ) having a set of data as input and the result of the same function f( ) having a set of encrypted form of the same data as input are transforms of each other (i.e., they are form pairs).

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, implemented at least partly by an encrypting device, for encrypting data, wherein the method comprises:
   obtaining a transformation function that satisfies at least linearity and convolution; and
      applying the transformation function, at least to first data, to generate and store, in a non-transitory computer readable storage medium, at least encrypted first data for the first data, wherein the transformation function satisfies a cyclic convolution modulo polynomial including one or more evaluation points as its roots,
   using the one or more evaluation points as one or more secret keys for encrypting the first data;
   inserting at least one secret or sensitive value at least into one component of a data signal; and;
   blinding the secret or sensitive value by adding blinding data into at least one component of a data signal for storing in the non-transitory computer readable storage medium.

2. The method of claim 1, wherein the transformation function includes a transformation map and the first data includes one or more components and/or coordinates, and the encrypted first data includes one or more components and/or coordinates for the first data.

3. The method of claim 1, wherein the method further comprises:
   applying at least one operation to the encrypted first data at least once to generate and store an encrypted modified data in the non-transitory computer readable storage medium as an encrypted result of the at least one operation applied to the first data, wherein the encrypted modified data can be decrypted by applying an inverse of the transformation function to obtain the result of the at least one operation applied to the first data.

4. The method of claim 3, wherein the at least one operation includes one or more of the following: an algebraic operation, at least one addition, at least one subtraction, at least one convolution and at least one component-wise multiplication.

5. The method of claim 1, wherein the method further comprises:
   dividing the at least encrypted first data into two or more encrypted parts;
   sending each of the encrypted parts to a different device for performing the at least one operation on the encrypted part to get an encrypted result part;
   obtaining two or more encrypted result parts;
   combining the two or more encrypted result parts to get an encrypted complete result; and
   applying the inverse function to the encrypted complete result to get a decrypted result.

6. The method of claim 1, wherein the transformation function is defined over an algebraic structure that satisfies at least linearity and convolution with respect to one or more algebraic operation.

7. The method of claim 6, wherein the algebraic structure includes one or more of the following: a ring, a polynomial ring, a group, and a field.

8. The method of claim 1, wherein the transformation function is expressed as one or more of the following: a discrete Fourier Transform (DFT), (P) NTT, ((Pseudo) Number theoretical transform), DHT (discrete Hartley transform), DCT (discrete cosine transform), multi-dimensional transforms, evaluation map and Lagrange transform).

9. The method of claim 1, wherein the blinding data include random data that is randomly generated.

10. The method of claim 1, wherein the method further comprises:
    using one or more evaluation points associated with the transformation function and one or more other values as one or more private keys in an encryption scheme; and
    using at least one encrypted data and modulus as one or more public keys in the encryption scheme.

11. The method of claim 10, wherein the method further comprises performing a public key encryption scheme by:
    using the published public key to encrypt a message; and
    performing one or more wrapping functions on the message to encrypt the message.

12. The method of claim 1, wherein the method further comprises:
    using one or more coefficients of the transformation function to generate a signature.

13. The method of claim 12, wherein at least one part of the signature includes: (i) an encrypted digest obtained by using a digest of a message that is inserted in at least one coefficients of the data to encrypted, and (ii) value obtained by performing one or more calculations on the data to be encrypted.

14. The method of claim 1, wherein the method further comprises searching or querying encrypted or modified data in an encrypted database by:
    providing an encrypted value for a value to be searched in the encrypted database;
    comparing the encrypted value with encrypted values stored in the encrypted database; and
    returning one or more matched entries of the encrypted database associated with one or more matching encrypted values stored in the data encrypted.

15. An encrypting system that includes one or more processors and memory configured to:

obtain a transformation function that satisfies at least linearity and convolution; and apply the transformation function, at least to first data, to generate and store, in a non-transitory computer readable storage medium, at least encrypted first data for the first data wherein the transformation function satisfies a cyclic convolution modulo polynomial including one or more evaluation points as its roots, uses the one or more evaluation points as one or more secret keys for encrypting the first data;

inserts at least one secret or sensitive value at least into one component of a data signal; and;

blinding the secret or sensitive value by adding blinding data into at least one component of a data signal for storing in the non-transitory computer readable storage medium.

16. A non-transitory computer readable storage medium storing at least executable code for encrypting data in encrypting system operable to execute executable code, wherein the executable code when executed:

obtains a transformation function that satisfies at least linearity and convolution; and applying the transformation function, at least to first data, to generate and store, in a non-transitory computer readable storage medium, at least encrypted first data for the first data wherein the transformation function satisfies a cyclic convolution modulo polynomial including one or more evaluation points as its roots, uses the one or more evaluation points as one or more secret keys for encrypting the first data;

inserts at least one secret or sensitive value at least into one component of a data signal; and;

blinding the secret or sensitive value by adding blinding data into at least one component of a data signal for storing in the non-transitory computer readable storage medium.

17. The non-transitory computer readable of claim 1, wherein the transformation function includes a transformation map and the first data includes one or more components and/or coordinates, and the encrypted first data includes one or more components and/or coordinates for the first data.

18. The computing system of claim 15, wherein the transformation function includes a transformation map and the first data includes one or more components and/or coordinates, and the encrypted first data includes one or more components and/or coordinates for the first data.

* * * * *